United States Patent
Luo et al.

(10) Patent No.: US 10,939,258 B2
(45) Date of Patent: Mar. 2, 2021

(54) SYSTEM AND METHOD FOR MARKETING MOBILE ADVERTISING SUPPLIES

(71) Applicant: xAd, Inc., New York, NY (US)

(72) Inventors: Huitao Luo, Fremont, CA (US); Nishant Khatri, Santa Clara, CA (US); Prakash Muttineni, San Ramon, CA (US); Srihari Venkatesan, Cupertino, CA (US); Dipanshu Sharma, Las Vegas, NV (US); Stephen Anderson, Cupertino, CA (US); George Rekouts, Mountain View, CA (US); Jonathan Schwartz, San Francisco, CA (US); David Chock, Saratoga, CA (US); Shanshan Tuo, Mountain View, CA (US); Can Liang, Mountain View, CA (US)

(73) Assignee: XAD, INC., New York, NY (US)

( * ) Notice: Subject to any disclaimer, the term of this patent is extended or adjusted under 35 U.S.C. 154(b) by 247 days.

(21) Appl. No.: 14/716,811

(22) Filed: May 19, 2015

(65) Prior Publication Data
US 2015/0332329 A1 Nov. 19, 2015

Related U.S. Application Data

(60) Provisional application No. 62/000,494, filed on May 19, 2014, provisional application No. 62/000,496, (Continued)

(51) Int. Cl.
*G06Q 30/02* (2012.01)
*H04W 4/21* (2018.01)
(Continued)

(52) U.S. Cl.
CPC .............. *H04W 4/21* (2018.02); *G06F 16/29* (2019.01); *G06Q 30/0261* (2013.01);
(Continued)

(58) Field of Classification Search
None
See application file for complete search history.

(56) References Cited

U.S. PATENT DOCUMENTS

| | | | | |
|---|---|---|---|---|
| 7,564,377 B2 * | 7/2009 | Kimchi | ................ | G01C 21/26 340/995.13 |
| 8,200,247 B1 * | 6/2012 | Starenky | ................ | G01C 21/28 455/404.2 |

(Continued)

FOREIGN PATENT DOCUMENTS

| | | |
|---|---|---|
| JP | 2012506207 A | 3/2012 |
| JP | 2012510681 A | 5/2012 |

(Continued)

OTHER PUBLICATIONS

Huerta, Juan the PlaceIQ analytic Platform: Location oriented approaches to mobile audiences (https://dl.acm.org/citation.cfm?id=2648588) (Year: 2014).*

(Continued)

*Primary Examiner* — Abhishek Vyas
*Assistant Examiner* — Alfred H Tsui
(74) *Attorney, Agent, or Firm* — Morgan, Lewis & Bockius LLP

(57) ABSTRACT

The present disclosure provides a mobile advertising platform in which mobile user locations and other information are translated into indications of mobile user intent to approach certain businesses, and advertisers can fill mobile advertising requests or choose to price their bids for mobile supplies based on such indications. In certain embodiments, pre-defined places associated with business/brand names are
(Continued)

created, and mobile advertising requests are processed to determine if the associated with mobile devices have triggered any of these pre-defined places. If a mobile advertising request is determined to have triggered one or more of the pre-defined places, it is annotated with the triggered place(s), and advertisements are selected based on the triggered places and other factors. The annotated requests with the triggered places can also be commodities in a location market place, which are auctioned to the mobile advertisers, who can place their bids on the triggered places.

20 Claims, 40 Drawing Sheets

Related U.S. Application Data filed on May 19, 2014, provisional application No. 62/000,497, filed on May 19, 2014, provisional application No. 62/000,499, filed on May 19, 2014, provisional application No. 62/000,501, filed on May 19, 2014, provisional application No. 62/066,912, filed on Oct. 22, 2014, provisional application No. 62/067,965, filed on Oct. 23, 2014, provisional application No. 62/119,807, filed on Feb. 24, 2015, provisional application No. 62/013,527, filed on Jun. 17, 2014.

(51) Int. Cl.
  *H04W 4/021* (2018.01)
  *H04L 29/08* (2006.01)
  *G06F 16/29* (2019.01)

(52) U.S. Cl.
  CPC ..... *G06Q 30/0267* (2013.01); *G06Q 30/0275* (2013.01); *H04L 67/20* (2013.01); *H04W 4/021* (2013.01)

(56) References Cited

U.S. PATENT DOCUMENTS

| | | | | |
|---|---|---|---|---|
| 8,401,897 | B1* | 3/2013 | Chatterjee | G06Q 30/0261 705/14.1 |
| 2009/0005987 | A1 | 1/2009 | Vengroff et al. | |
| 2011/0238476 | A1 | 9/2011 | Carr et al. | |
| 2012/0158508 | A1 | 6/2012 | Kilroy et al. | |
| 2012/0245990 | A1 | 9/2012 | Agarwal | |
| 2012/0246003 | A1 | 9/2012 | Hart et al. | |
| 2013/0143586 | A1 | 6/2013 | Williams et al. | |
| 2013/0267255 | A1* | 10/2013 | Liu | H04W 4/029 455/456.3 |
| 2013/0275228 | A1* | 10/2013 | Milazzo | G06Q 30/00 705/14.66 |
| 2014/0057650 | A1 | 2/2014 | Versteeg et al. | |
| 2014/0067938 | A1 | 3/2014 | Boldyrev et al. | |
| 2014/0128104 | A1* | 5/2014 | Chang | G06F 16/2228 455/456.3 |
| 2014/0129566 | A1 | 5/2014 | Chang et al. | |
| 2014/0162692 | A1* | 6/2014 | Li | H04L 67/306 455/456.3 |
| 2014/0344718 | A1 | 11/2014 | Paraport et al. | |
| 2015/0148060 | A1* | 5/2015 | Parab | H04W 4/021 455/456.1 |
| 2015/0148061 | A1* | 5/2015 | Koukoumidis | H04W 4/022 455/456.1 |

FOREIGN PATENT DOCUMENTS

| | | |
|---|---|---|
| JP | 2013080402 A | 5/2013 |
| JP | 2014507729 A | 3/2014 |
| WO | 2007136575 | 11/2007 |
| WO | WO2010044872 A1 | 4/2010 |
| WO | WO2010065235 A2 | 6/2010 |
| WO | WO2012129224 A1 | 9/2012 |

OTHER PUBLICATIONS

Non-Final Office Action, U.S. Appl. No. 13/867,021, filed Apr. 19, 2013, entitled "Method and Apparatus for Probabilistic User Location," dated Dec. 12, 2014.
Response to Non-Final Office Action, U.S. Appl. No. 13/867,021, filed Apr. 19, 2013, entitled "Method and Apparatus for Probabilistic User Location," filed Mar. 12, 2015.
Non-Final Office Action, U.S. Appl. No. 13/867,029, filed Apr. 19, 2013, entitled "Method and Apparatus for Geographic Document Retrieval," dated Mar. 6, 2015.
Supplemental Amendment and Response to Non-Final Office Action dated Mar. 6, 2015, U.S. Appl. No. 13/867,029, filed Apr. 19, 2013, entitled "Method and Apparatus for Geographic Document Retrieval," filed Jun. 8, 2015.
Zhou, Hybrid Index Structures for Location-based Web Search, 2005, http://delivery.acm.org/10./1145/1100000/1099584/p155-zhou.pdf?ip=151.207.250.71&id=1099584&acc=active%20service&key=C15944E53D0ACA63%2E4D4702B0C3E38B35%2E4D4702B0C3E38B35%2E4D4702B0C3E38B35&cfid=481269756&cftoken=78369420&_acm_=1424702083_2be6d2c783b6de99b7aae80da8fac423.
Lucene, https://web.archive.org/web/20110802041330/http://wiki.apache.org/lucene-java/LuceneFAQ. 2011.
Written Opinion of the International Searching Authority, Patent Cooperation Treaty Application PCT/US2015/031638, filed May 19, 2015, entitled "System and Method for Marketing Mobile Advertising Supplies," dated Aug. 14, 2015.
International Search Report, Patent Cooperation Treaty Application PCT/US2015/031638, filed May 19, 2015, entitled "System and Method for Marketing Mobile Advertising Supplies," dated Aug. 14, 2015.
Search History, Patent Cooperation Treaty Application PCT/US2015/031638, filed May 19, 2015, entitled "System and Method for Marketing Mobile Advertising Supplies," dated Aug. 14, 2015.
XAd, Inc. Notification of Reasons for Refusal, JP2018-071731, dated Dec. 18, 2018, 4 pgs.
XAd, Inc. Notification of Reasons for Refusal, JP2018-071737, dated Dec. 18, 2018, 4 pgs.
Supplementary Partial European Search Report dated Feb. 21, 2018, in related European Patent Application No. 15 79 6440 (14 pages).
XAD, Inc., European Patent App. 15796440.4-1218, Amended Claims, dated Jun. 19, 2019, 15 pgs.
XAD, Inc., Communication 94(3) EPC 15796440.4, dated Feb. 20, 2019, 6 pgs.
XAd-Inc., Notification of Reasons for Refusal, JP2017-513598, dated Mar. 20, 2018, 9 pgs.
XAd, Extended European Search Report , EP15796440.4, dated Jun. 5, 2018, 12 pgs.
XAd, Communication Pursuant to Rules 70(2) and 70a(2), EP15796440.4, dated Jun. 22, 2018, 1 pg.

* cited by examiner

| Name/Brand | Category | Place Identifier | Place Type | Spatial Index | Doc ID |
|---|---|---|---|---|---|
| Costco | General | US/CA/Almaden | BC | a1, a2, ..., ai | 132475 |
| Costco | General | US/CA/Almaden | BP | b1, b2, ..., bj | 135678 |
| Costco | General | US/CA/Almaden | BR | c1, c2, ..., ck | 136572 |
| T.J Maxx | Department | US/CA/Almaden | BC | d1, d2, ..., dl | 156321 |
| T.J Maxx | Department | US/CA/Almaden | BP | e1, e2, ..., em | 154376 |
| T.J Maxx | Department | US/CA/Almaden | BR | c1, c2, ..., ck | 157643 |
| Trader Joe's | Grocery | US/CA/Almaden | BC | f1, f2, ..., fn | 256321 |
| ...... | ...... | ...... | | ...... | |

FIG. 4C

| IP Address | Spatial Index | Centroid | Other information |
|---|---|---|---|
| 194.66.82.11 | a1, a2, ..., ai | --- | --- |
| 196.45.3213 | b1, b2, ..., bj | --- | --- |
| 198.65.32.47 | c1, c2, ..., ck | --- | --- |
| 199.33.63.43 | d1, d2, ..., dl | --- | --- |
| 201.36.76.23 | e1, e2, ..., em | --- | --- |
| 207.15.63.32 | c1, c2, ..., ck | --- | --- |
| 222.31.113.64 | f1, f2, ..., fn | --- | --- |
| ... | ... | ... | ... |

FIG. 14

Store/Brand 1580

| User Identifiers | Categories | Time Stamp | Retargeting Factor |
|---|---|---|---|
| U1 | C1, C5 | T1 | 0.9 |
| U2 | C2, C9 | T2 | 0.7 |
| U3 | C1, C3 | T3 | 0.3 |

FIG. 16A

| events | Device Information | | User Information | | | Location Information | | Time of Request | | Retargeting Factor |
|---|---|---|---|---|---|---|---|---|---|---|
| | UID | Make/Model | Age | Gender | Education | Business Name | Fence Type | Day | Hour | |
| 1 | 22***369 | Iphone 4 | 22 | F | C/U | B2 | BC | 3/1/2014 | 12:55 | 1.00 |
| 2 | 56***845 | Iphone 5 | 17 | F | HS | B1 | BP | 3/1/2014 | 12:53 | 0.9 |
| 3 | 36***963 | Nokia 2300 | 25 | M | C/U | B1 | BR | 3/1/2014 | 12:53 | 0.7 |
| 4 | 45***895 | Nokia 4566 | 36 | F | HS | B2 | BR | 3/1/2014 | 12:52 | 0.7 |
| 5 | 36***412 | Samsung 1179 | 23 | M | G/S | B1 | BP | 3/1/2014 | 12:51 | 0.9 |
| ... | ... | ... | ... | ... | ... | | | | | |
| 9975 | 78***697 | Samsung 1179 | 22 | F | C/U | B1 | BC | 2/24/2014 | 10:31 | 0.70 |
| 9976 | 75***326 | Nokia 4500 | 40 | M | HS | B3 | BC | 2/24/2014 | 10:30 | 0.70 |

FIG. 16B

| Ad ID | Biz/Brand Name | Category | Request Attributes | | | | | | Fence Type | Pricing |
|---|---|---|---|---|---|---|---|---|---|---|
| | | | Device Type | User Age | User Gender | ... | Day | Hour | | |
| 01231 | Costco | General | All | 20-50 | Both | ... | All | 10-21 | BC | $30 CPM |
| 01232 | Costco | Electronics | All | 20-50 | Both | ... | All | 10-21 | BP | $20 CPM |
| 01233 | Costco | Fast Food | All | 20-50 | Both | ... | Mon-Fri | 11-14 | BR | $10 CPM |
| ... | ... | ... | ... | ... | ... | ... | ... | ... | ... | ... |
| 02457 | T.J. Maxx | Department | All | 20-60 | Both | ... | All | 11-19 | BC | $30 CPM |
| ... | ... | ... | ... | ... | ... | ... | ... | ... | ... | ... |
| 10293 | In n Out | Fast Food | All | 20-60 | Both | ... | All | 10-21 | BR | $0.05 CPC |
| ... | ... | ... | ... | ... | ... | ... | ... | ... | ... | ... |

FIG. 16C

|   | Location Information | | | Time of Request | | Ad Category | Response ("+": click; "-": no click) |
|---|---|---|---|---|---|---|---|
|   | Device Location | Business Name | Fence Type | Day | Hour | | |
| 1 | (38.45, -102.27) | B2 | BP | 3/1/2014 | 12:55 | C2 | + |
| 2 | (45.32, -110.78) | B1 | BC | 3/2/2014 | 2:53 | C1 | - |
| 3 | (45.35, -110.75) | B2 | BC | 3/6/2014 | 12:53 | C1 | - |
| 4 | (39.45, -104.98) | B2 | BP | 3/10/2014 | 12:52 | C2 | + |
| 5 | (45.33, -110.76) | B3 | BR | 3/12/2014 | 4:51 | C3 | - |
| ... | ... | | | | | | |
| 199 | (45.35, -110.74) | B4 | BP | 8/29/2014 | 10:31 | C1 | + |
| 200 | (30.14, -98.25) | B5 | BC | 8/31/2014 | 10:30 | C5 | - |

FIG. 17

| Fence Type Distribution | BC | BP | BR | | |
| --- | --- | --- | --- | --- | --- |
| | 30% | 30% | 40% | | |
| Age Distribution | 20-29 | 30-39 | 40-49 | 50-59 | >60 |
| | 50% | 40% | 10% | 0% | 0% |
| Gender Distribution | Male | Female | | | |
| | 20% | 80% | | | |
| Education Level Distribution | HS | C/U | G/S | | |
| | 20% | 60% | 20% | | |
| Annual Income Distribution | <$50K | $50K-$100K | >100K | | |
| | 10% | 60% | 30% | | |
| Device Make/Model Distribution | iPhone | Samsung | Others | | |
| | 30% | 30% | 30% | | |

FIG. 18

|  | Matching Ad 1 (01231) | Matching Ad 2 (01232) | Matching Ad 3 (01233) | Matching Ad 4 (02457) | Matching Ad N (20493) |
|---|---|---|---|---|---|
| SF1 | 0.2 | 0.6 | 0.3 | 0.5 | 1 |
| SF2 | 0.5 | 1 | 0.5 | 0.5 | 0.5 |
| SF3 | 1 | 1 | 0.5 | 0.5 | 0.5 |
| SF4 | 0.4 | 0.2 | 0.7 | 0.0 | 0.0 |
| FSF | 0.63 | 0.56 | 0.2 | 0.45 | 0.4 |

FIG. 20

| Age Distribution | 20-29 | 30-39 | 40-49 | 50-59 | >60 |
|---|---|---|---|---|---|
| | 25% | 30% | 20% | 15% | 10% |

| Gender Distribution | Male | Female |
|---|---|---|
| | 45% | 55% |

| Education Level Distribution | HS | C/U | G/S |
|---|---|---|---|
| | 20% | 40% | 40% |

| Annual Income Distribution | <$50K | $50K-$100K | >100K |
|---|---|---|---|
| | 30% | 40% | 30% |

| Device Make/Model Distribution | iPhone | Samsung | Others |
|---|---|---|---|
| | 30% | 30% | 30% |

FIG. 25

| Data Groups | Device Information | | User Information | | | Location Information | | Time of Request | |
|---|---|---|---|---|---|---|---|---|---|
| | IMEI | Make/Model | Age | Gender | Education | Device Location | Business Name | Day | Hour |
| 1 | 22***369 | iphone 4 | 22 | F | C/U | (38.45, -102.27) | B2 | 3/1/2014 | 09:55 |
| 2 | 56***845 | iphone 5 | 17 | F | HS | (45.32, -110.78) | B1 | 3/1/2014 | 09:53 |
| 3 | 36***963 | Nokia 2300 | 25 | M | C/U | (45.35, -110.75) | B1 | 3/1/2014 | 09:53 |
| 4 | 45***895 | Nokia 4566 | 36 | F | HS | (39.45, -104.98) | B2 | 3/1/2014 | 09:32 |
| 5 | 36***412 | Samsung 1179 | 23 | M | G/S | (45.33, -110.76) | B1 | 3/1/2014 | 09:21 |
| ... | ... | ... | ... | ... | ... | ... | | | |
| 9975 | 78***697 | Samsung 1179 | 22 | F | C/U | (45.35, -110.74) | B1 | 2/28/2014 | 10:01 |
| 9976 | 75***326 | Nokia 4500 | 40 | M | HS | (30.14, -98.25) | B3 | 2/28/2014 | 10:00 |

FIG. 26

| Age Distribution | 20-29 | 30-39 | 40-49 | 50-59 | >60 |
|---|---|---|---|---|---|
| | 50% | 40% | 10% | 0% | 0% |

| Gender Distribution | Male | Female |
|---|---|---|
| | 20% | 80% |

| Education Level Distribution | HS | C/U | G/S |
|---|---|---|---|
| | 20% | 60% | 20% |

| Annual Income Distribution | <$50K | $50K-$100K | >100K |
|---|---|---|---|
| | 10% | 60% | 30% |

| Device Make/Model Distribution | iPhone | Samsung | Others |
|---|---|---|---|
| | 30% | 30% | 30% |

FIG. 27

SYSTEM AND METHOD FOR MARKETING MOBILE ADVERTISING SUPPLIES

CROSS REFERENCE TO RELATED APPLICATIONS

The present application claims the benefit of priority to U.S. Provisional Patent Application No. 62/000,494, filed May 19, 2014, entitled "Method and Apparatus for Visualizing Real-Time Location-Based Events," U.S. Provisional Patent Application No. 62/000,496, filed May 19, 2014, entitled "Method and Apparatus for Retargeting Mobile Users Based on Store Visits," U.S. Provisional Patent Application No. 62/000,497, filed May 19, 2014, entitled "Method and Apparatus for Increasing Store Visitation Responses to Location-Based Mobile Advertising," U.S. Provisional Patent Application No. 62/000,499, filed May 19, 2014, entitled "Method and Apparatus for Modeling and Using Mobile User Intent Profile in Location-Based Mobile Advertising," U.S. Provisional Patent Application No. 62/000,501, filed May 19, 2014, entitled "Method and Apparatus for Deriving and Using IP regions in Location-Based Mobile Advertising," U.S. Provisional Patent Application No. 62/066,912, filed Oct. 22, 2014, entitled "Method and Apparatus for Geo-Fencing Using Map Overlay," U.S. Provisional Patent Application No. 62/067,965, filed Oct. 23, 2014, entitled "Method and Apparatus for Mobile Advertising Using 3D Geo-Fencing," U.S. Provisional Patent Application No. 62/119,807, filed Feb. 24, 2015, entitled "Methods and Apparatus for Marketing Mobile Advertising Supplies," each of which is incorporated herein by reference in its entirety. The present application is related to co-pending U.S. patent application Ser. No. 13/867,025, filed Apr. 19, 2013, U.S. patent application Ser. No. 13/867,029, filed Apr. 19, 2013, now U.S. Pat. No. 9,210,540, U.S. patent application Ser. No. 14/716,813, entitled "System and Method for Visualizing Real-Time Location-Based Events," filed May 19, 2015, and U.S. patent application Ser. No. 14/716,816, entitled "System and Method for Estimating Mobile Device Locations," filed May 19, 2015, now U.S. Pat. No. 9,886,703 each of which is incorporated herein by reference in its entirety.

FIELD

The present disclosure is related to mobile advertising, and more particularly to methods and apparatus for marketing location-based supplies in mobile advertising.

DESCRIPTION OF THE RELATED ART

Mobile applications are increasingly sending device location information to service providers to enable location-based services (LBS). Accordingly, in mobile advertising, advertisers are interested in delivering relevant ads to users' mobile devices based on their locations. Thus, mobile advertising supplies are sold by their locations (i.e., supplies at certain locations are more marketable than other locations).

As mobile advertising becomes more and more popular, various pricing models have been developed based on different strategies for purchasing mobile advertising campaigns geared at accommodating an advertiser's budget. Examples of mobile advertising pricing models include cost-per-mille (CPM), cost-per-install (CPI), and cost-per-click (CPC) models. These are just a few of the basic mobile advertising pricing models, which advertisers can select to promote their products or companies on mobile devices.

CPM is the advertising model that is sometimes referred to as "pay-per-impressions." CPM in contemporary English simply means "cost per thousand." In a CPM campaign, an advertiser pays the agreed bid price for every 1,000 times that an ad is displayed on mobile devices. Since CPM advertisers pay for impressions and not for clicks and installs, they tend to use mobile advertising mainly to raise brand awareness.

CPI, also known as cost-per-acquisition, charges advertisers every time a mobile advertisement ("ad") results in a conversion, which can be, for example, people actually making a purchase, downloading an app, or performing another action desired by the advertiser. Thus, CPI campaigns help to give medium and small companies with limited marketing budgets a predictable return on their advertising investment.

With the CPC model, advertisers pay per click (also know as PPC), whether or not the clicks they pay result in conversion. Ads are served to mobile device users based on a combination of the click-through rate (CTR) of the ads and the per-click bids that advertisers make.

With any pricing model, a price needs to be decided for an advertisement (ad) campaign based on relevant factors. For example, many businesses have specific physical locations where they sell their goods and would like to target mobile users who have been or are currently in or near their stores. Also, each business has its own characteristics, which may affect how much it is willing to pay for certain ads. For example, a business can be a fast food restaurant selling fast food, or a car dealer selling cars. Fast food costs far less than cars, while fast food is bought far more frequently than cars bought. Furthermore, for any particular business, it may price its ads differently based on how likely certain mobile users would respond to its ads. Therefore, methods and system for marketing mobile advertising supplies by taking into account of these and other factors are needed to deliver precise, relevant, and timely advertisements (ads) to consumers based on estimates of their locations at the moments of delivery.

BRIEF DESCRIPTION OF THE DRAWINGS

FIG. 4C is a table illustrating examples of geo-fences stored in a geo-fence database according to certain embodiments.

FIG. 14 illustrates a few examples of IP regions stored in the database as spatial indices together with the associated IP addresses and other information such as their respective centroids, etc. according to certain embodiments.

FIG. 16A is a table illustrating a retargeting database according to certain embodiments.

FIG. 16B is a table of examples of location-based events according to certain embodiments.

FIG. 16C is a table of exemplary matching criteria for advertisement documents according to certain embodiments.

FIG. 17 is a table of exemplary listing of location information, time of request, advertisement category and mobile user responses for fulfilled ad requests according to certain embodiments.

FIG. 18 is a block diagram illustrating exemplary statistical results according to certain embodiments.

FIG. 20 is a table illustrating selection factors associated with different advertisement documents according to certain embodiments.

FIG. 25 is a block diagram illustrating exemplary statistics of a pre-selected panel of mobile users according to certain embodiments.

FIG. 26 is a table illustrating exemplary mobile device data according to certain embodiments.

FIG. 27 a block diagram illustrating exemplary statistical results derived by the SVL system according to certain embodiments

DESCRIPTION OF THE EMBODIMENTS

Figure 1:
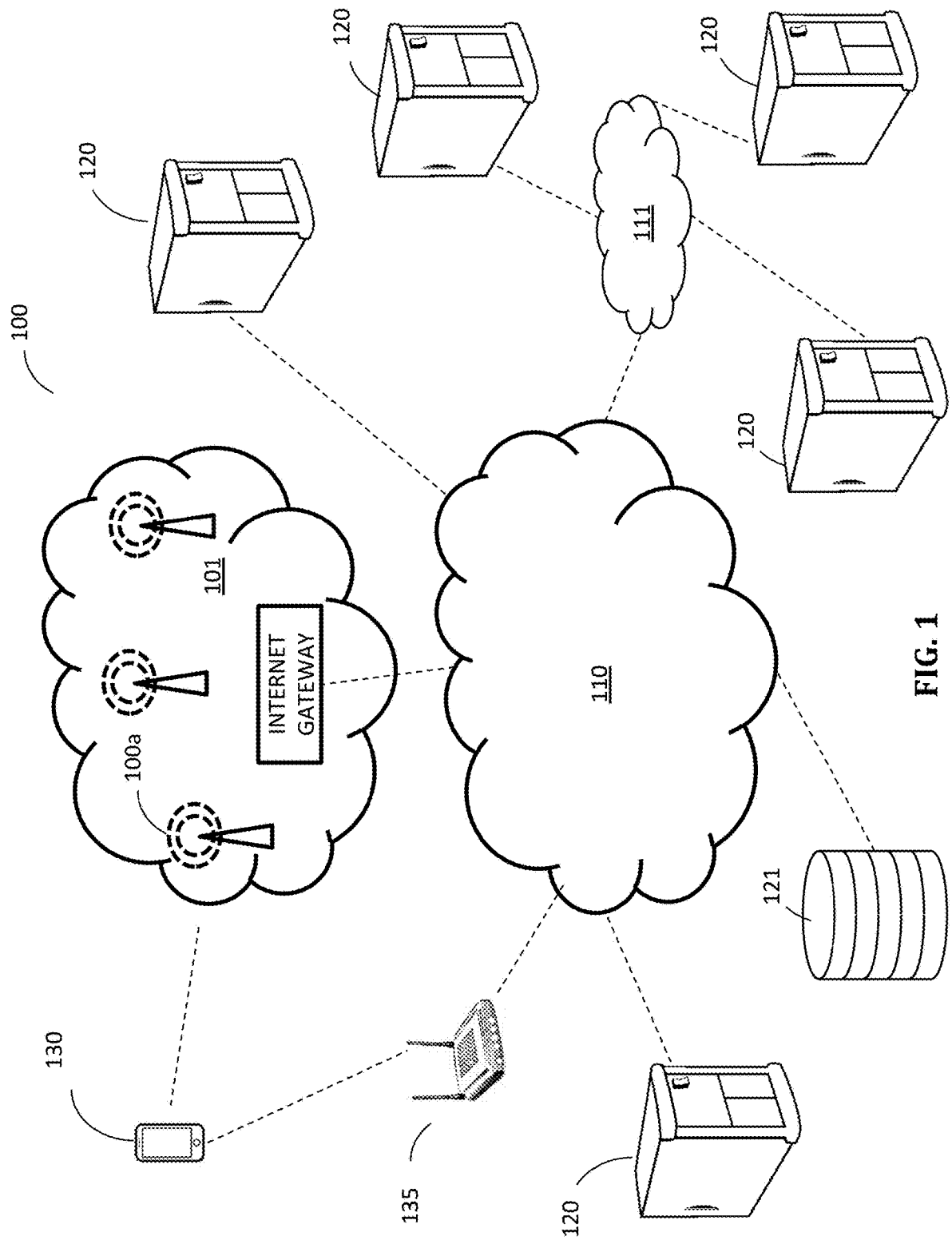
FIG. 1 is a diagrammatic representation of a packet-based network according to embodiments.

The present disclosure provides a mobile advertising platform in which mobile user locations and other information are translated into indications of mobile user intent to approach certain businesses, and advertisers can fill mobile advertising requests or choose to price their bids for mobile supplies based on such indications. In certain embodiments, pre-defined places associated with business/brand names are created, and mobile advertising requests are processed to determine if the associated with mobile devices have triggered any of these pre-defined places. If a mobile advertising request is determined to have triggered one or more of the pre-defined places, it is annotated with the triggered place(s), and advertisements are selected based on the triggered places and other factors. The annotated requests with the triggered places can also be commodities in a location market place, which are auctioned to the mobile advertisers, who can place their bids on the triggered places.

In certain embodiments, a computer system coupled to a packet-based network to processes advertisement (ad) requests according to a ad request processing method. The ad request processing method comprises receiving an ad request from the packet-based network, the ad request being associated with a mobile device, and estimating a location of the mobile device based on information in the ad request. The ad request processing method further comprises determining if the estimated location of the mobile device triggers one or more pre-defined places in a geo-fence database stored in a storage device, and generating an annotated ad request including one or more triggered places.

In certain embodiment, estimating the location of the mobile device comprises translating an IP address in the ad request into a probabilistic representation of a possible location of the mobile device. In certain embodiments, an IP region for a particular IP address is derived from a plurality of requests made over certain period of time, each of the plurality of requests including the particular IP address and GPS based location data (e.g., longitude/latitude or LL). The particular IP address may be associated with a stationary device like a router to which a mobile device can be connected through WiFi to a packet-based network (e.g., the Internet). Thus, when a new request comes in with this particular IP address and unreliable LL (or no LL), the IP region is used as a probable location for the new request, and advertisement can be served based on this probable location. In certain embodiments, the IP region has a center and a size, and the center of the IP region can be used as an approximate location for the mobile user associated with the new request, with the inverse of the size serving as a measure of certainty for the location. Or, the entire boundary of the IP region can be used as a probable area for the location of the mobile user.

In certain embodiments, the one or more triggered places including a first place, the first place being represented by a place type and at least one of a category, a brand name, and a place identifier. The place type is selected from a plurality of place types, such as a business center, a business premise and a business region, each, some, or all of which can be associated with a single business.

In certain embodiments, the method further comprises searching in an ad database for one or more matching ads that match the annotated request, selecting an ad from the one or more matching ads, and transmit the selected ad to the packet-based network. Each respective matching ad in the one or more matching ads is associated with one or more places that matches one or more of the one or more triggered places in the annotated request.

In certain embodiments, the ad request includes an identifier identifying the mobile device or a mobile user thereof, and selecting an ad from the one or more matching ads comprises consulting a mobile user intent profile associated with the identifier in a mobile user intent profile database.

In certain embodiments, selecting an ad from the one or more matching ads comprises consulting a retargeting database storing information about mobile users who have visited a geographical location corresponding to one of the triggered places.

In certain embodiments, selecting an ad from the one or more matching ads comprises consulting statistical data associated with at least one of the one or more triggered places.

In certain embodiments, the annotated request further includes a price for each of the one or more places.

In certain embodiments, the ad request processing method further comprises transmitting the annotated ad request to the packet-based network, and may further comprise receiving a bid for one of the one or more triggered places in the annotated request, the bid including a bidder identifier, a request identifier, and a bid price. The ad request processing method may further comprise searching in an ad database for one or more matching ads that match the annotated request, selecting an ad from the one or more matching ads, and determining whether to accept the bid based on the bid price and prices associated with the one or more matching ads.

In certain embodiments, estimating a location of the mobile device comprises: determining if the ad request includes a set of geographic coordinates that meet a set of predefined criteria, in response to the set of geographic coordinates in the ad request not meeting the set of predefined criteria, determining if the ad request includes an IP address and querying an IP region database using the IP address; and in response to finding a matching IP address in the IP region database, using geographical coordinates associated with the matching IP address in the IP region database as the estimated location of the mobile devise. The geographical coordinates are associated with a geographic region and the confidence factor is dependent on the size of the geographic region.

In certain embodiment, an IP region for a particular IP address is derived from a plurality of requests made over certain period of time, each of the plurality of requests including the particular IP address and GPS based location data (e.g., longitude/latitude or LL). The particular IP address may be associated with a stationary device like a router to which a mobile device can be connected through WiFi to a packet-based network (e.g., the Internet). Thus, when a new request comes in with this particular IP address and unreliable LL (or no LL), the IP region is used as a probable location for the new request, and advertisement can be served based on this probable location. In certain embodiments, the IP region has a center and a size, and the center of the IP region can be used as an approximate location for the mobile user associated with the new request, with the inverse of the size serving as a measure of certainty for the location. Or, the entire boundary of the IP region can be used as a probable area for the location of the mobile user.

In certain embodiments, a computer system coupled to a packet-based network via wired or wireless network connections performs an SVL method to obtain statistical results for location-based advertising, the method comprises delivering a first digital advertisement to a first group of mobile devices via the packet-based network; receiving a first set of mobile device data associated with at least some of the first group of mobile devices, the mobile device data including location information, mobile device information and mobile user information; identifying a second set of mobile device data among the first set of mobile device data, the second set of mobile device data including location information that indicates responses to the first digital advertisement; generating statistical results using the second set of mobile device data; and storing the statistical results in a storage device.

In certain embodiments, the first group of mobile devices includes a pre-selected panel of mobile devices configured to periodically provide their location information to one or more computer systems in the packet-based network, and the first set of mobile device data includes mobile device data associated with at least some of the pre-selected panel of mobile devices.

In certain embodiments, the first set of mobile device data includes mobile device data included in requests for documents from one or more second computer systems interacting with at least some of the first group of mobile devices.

In certain embodiments, the first set of mobile device data includes mobile device data provided by one or more second computer systems in the packet-based network running one or more software development kits that apply logic to control timing of transmitting mobile device data to the first computer system.

In certain embodiments, identifying the second set of mobile device data comprises determining whether any of the location information in the first set of mobile device data includes geographical coordinates that correspond to one or more geographic regions associated with the first digital advertisement.

In certain embodiments, the statistical results include trends related to one or more of a set of parameters consisting of: age, gender, education level, time of response, make and model of mobile devices.

FIG. 1 illustrates a packet-based network 100 (referred sometimes herein as "the cloud"), which, in some embodiments, includes part or all of a cellular network 101, the Internet 110, and computers/servers 120, coupled to the Internet (or web) 110. The computers/servers 120 can be coupled to the Internet 110 using wired Ethernet and optionally Power over Ethernet (PoE), WiFi, and/or cellular connections via the cellular network 101 including a plurality of cellular towers 101a. The network may also include one or more network attached storage (NAS) systems 121, which are computer data storage servers connected to a computer network to provide data access to a heterogeneous group of clients. As shown in FIG. 1, one or more mobile devices 130 such as smart phones or tablet computers are also coupled to the packet-based network via cellular connections to the cellular network 101, which is coupled to the Internet 110 via an Internet Gateway. When a WiFi hotspot (such as hotspot 135) is available, a mobile device 130 may connect to the Internet 110 via a WiFi hotspot 135 using its built-in WiFi connection. Thus, the mobile devices 130 may interact with other computers/servers coupled to the Internet 110.

The computers/servers 120 coupled to the Internet may include one or more publishers that interact with mobile devices running apps provided by the publishers, one or more ad middlemen or ad networks that act as intermediaries between publishers and advertisers, one or more ad servers that select and send advertisement documents to the publishers to post on mobile devices, one or more computers/servers running ad exchanges, one or more computers/servers that post mobile supplies on the ad exchanges, and/or one or more advertisers that monitor the ad exchanges and place bids for the mobile supplies posted in the ad exchanges. The publishers, as they interact with the mobile devices, generate the mobile supplies, which can be requests for advertisements (ad requests) carrying characteristics of the mobile devices, certain information about their users, and raw location data associated with the mobile devices, etc. The publishers may post the mobile supplies on the ad exchanges for bidding by the advertisers or their agents, transmit the mobile supplies to an ad agent or ad middleman for fulfillment, or fulfill the supplies themselves.

Advertisers, agencies, publishers and ad middlemen can also purchase mobile supplies through ad exchanges. Ad networks and other entities also buy ads from exchanges. Ad networks typically aggregate inventory from a range of publishers, and sell it to advertisers for a profit. An ad exchange is a digital marketplace that enables advertisers and publishers to buy and sell advertising space (impressions) and mobile ad inventory. The price of the impressions can be determined by real-time auction, through a process known as real-time bidding. That means there's no need for human salespeople to negotiate prices with buyers, because impressions are simply auctioned off to the highest bidder. These processes take place in milliseconds, as a mobile device loads an app or webpage.

Advertisers and agencies can use demand-side platforms (DSP), which are softwares that use certain algorithms to decide whether to purchase a certain supply. Many ad networks now also offer some sort of DSP-like product or real-time bidding capability. As on-line and mobile publishers are making more of their inventory available through exchanges, it becomes more cost efficient for many advertisers to purchase ads using DSPs.

An ad server is a computer server, e.g., a web server, backed by a database server, that stores advertisements used in online marketing and place them on web sites and/or mobile applications. The content of the webserver is constantly updated so that the website or webpage on which the ads are displayed contains new advertisements—e.g., banners (static images/animations) or text—when the site or page is visited or refreshed by a user. In addition to selecting and delivering ads to users, the ad servers also manage website advertising space and/or to provide an independent counting and tracking system for advertisers. Thus, the ad servers provide/serve ads, count them, choose ads that will make the websites or advertisers most money, and monitor progress of different advertising campaigns. Ad servers can be publisher ad servers, advertiser ad servers, and/or ad middleman ad servers. An ad server can be part of the same computer or server that also act as a publisher, advertiser, and ad middleman.

Ad serving may also involve various other tasks like counting the number of impressions/clicks for an ad campaign and generating reports, which helps in determining the return on investment (ROI) for an advertiser on a particular website. Ad servers can be run locally or remotely. Local ad servers are typically run by a single publisher and serve ads to that publisher's domains, allowing fine-grained creative, formatting, and content control by that publisher. Remote ad servers can serve ads across domains owned by multiple publishers. They deliver the ads from one central source so that advertisers and publishers can track the distribution of their online advertisements, and have one location for controlling the rotation and distribution of their advertisements across the web.

The computer/servers 120 can include server computers, client computers, personal computers (PC), tablet PC, set-top boxes (STB), personal digital assistant devices (PDA), web appliances, network routers, switches or bridges, or any computing devices capable of executing instructions that specify actions to be taken by the computing devices. As shown in FIG. 1, some of the computers/servers 120 are coupled to each other via a local area network (LAN) 110, which in turn is coupled to the Internet 110. Also, each computer/server 120 referred herein can include any collection of computing devices that individually or jointly execute instructions to provide one or more of the systems discussed herein, or to perform any one or more of the methodologies or functions discussed herein, or to act individually or jointly as one or more of a publisher, an advertiser, an advertisement agency, an ad middleman, an ad server, an ad exchange, etc., which employs the systems, methodologies, and functions discussed herein.

Figure 2:
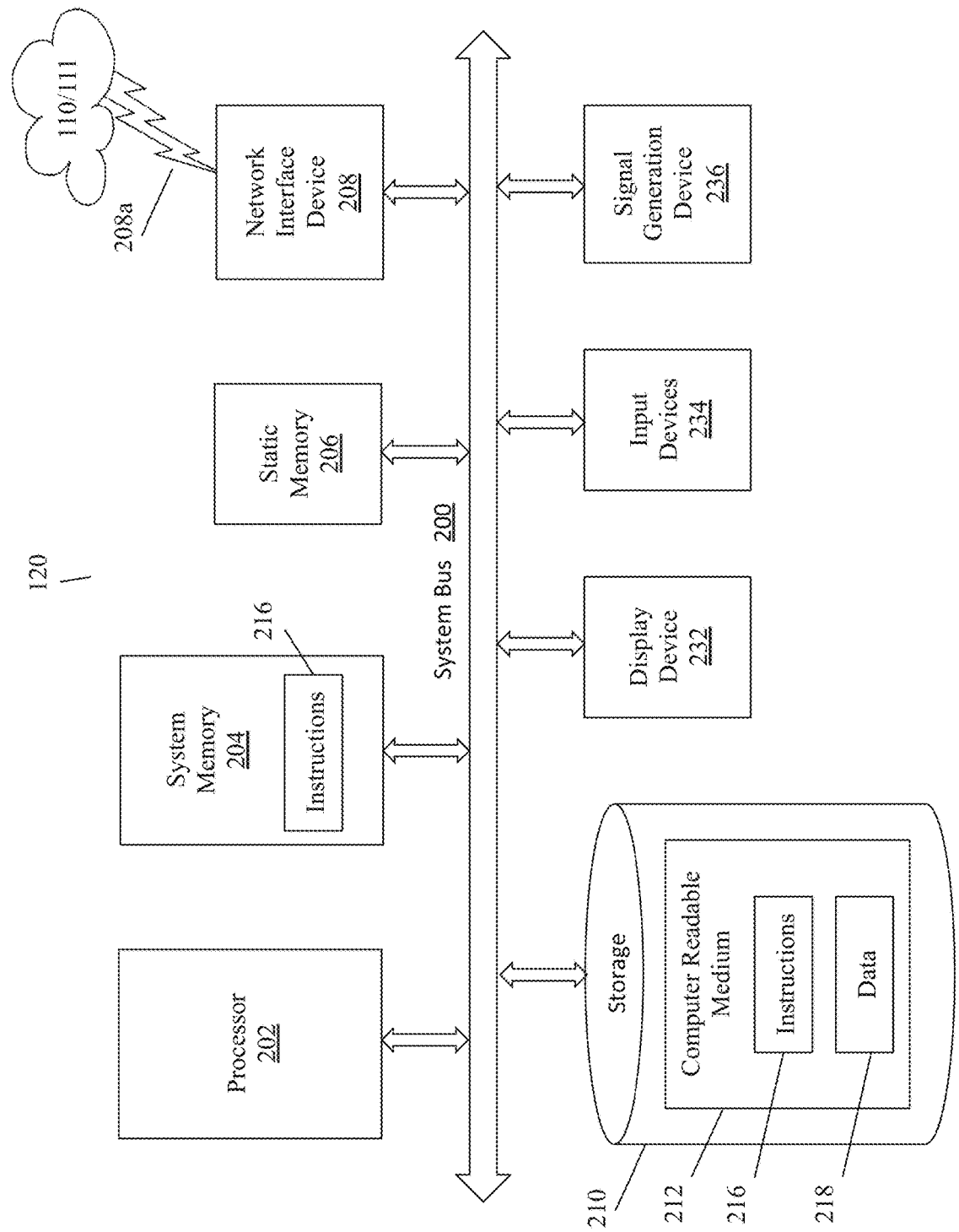
FIG. 2 is a diagrammatic representation of a computer/server that performs one or more of the methodologies and/or to provide one or more of the systems in an advertisement platform according to embodiments.

FIG. 2 illustrates a diagrammatic representation of a computer/server 120 that can be used to perform one or more of the methodologies and/or to provide one or more of the systems in an advertisement platform discussed herein, by executing certain instructions. The computer/server 120 may operate as a standalone device or as a peer computing device in a peer-to-peer (or distributed) network computing environment. As shown in FIG. 2, the computer/server 120 includes one or more processors 202 (e.g., a central processing unit (CPU), a graphic processing unit (GPU), and/or a digital signal processor (DSP)) and a system or main memory 204 coupled to each other via a system bus 200. The computer/server 120 may further include static memory 206, a network interface device 208, a storage unit 210, one or more display devices 230, one or more input devices 234, and a signal generation device (e.g., a speaker) 236, with which the processor(s) 202 can communicate via the system bus 200.

In certain embodiments, the display device(s) 230 include one or more graphics display units (e.g., a plasma display panel (PDP), a liquid crystal display (LCD), a projector, or a cathode ray tube (CRT)). The input device(s) 234 may include an alphanumeric input device (e.g., a keyboard), a cursor control device (e.g., a mouse, trackball, joystick, motion sensor, or other pointing instrument). The storage unit 210 includes a machine-readable medium 212 on which is stored instructions 216 (e.g., software) that enable anyone or more of the systems, methodologies or functions described herein. The storage unit 210 may also store data 218 used and/or generated by the systems, methodologies or functions. The instructions 216 (e.g., software) may be loaded, completely or partially, within the main memory 204 or within the processor 202 (e.g., within a processor's cache memory) during execution thereof by the computer/server 120. Thus, the main memory 204 and the processor 1102 also constituting machine-readable media.

While machine-readable medium 212 is shown in an example implementation to be a single medium, the term "machine-readable medium" should be taken to include a single medium or multiple media (e.g., a centralized or distributed database, or associated caches and servers) able to store instructions (e.g., instructions 1124). The term "machine-readable medium" shall also be taken to include any medium that is capable of storing instructions (e.g., instructions 216) for execution by the computer/server 120 and that cause the computing device 1100 to perform anyone or more of the methodologies disclosed herein. The term "machine-readable medium" includes, but not be limited to, data repositories in the form of solid-state memories, optical media, and magnetic media. In certain embodiments, the instructions 216 and/or data 218 can be stored in the network 100 and accessed by the computer/server 120 via its network interface device 208, which provides wired and/or wireless connections to a network, such as a local area network 111 and/or a wide area network (e.g., the Internet 110) via some type of network connectors 280a. The instructions 216 (e.g., software) and or data 218 may be transmitted or received via the network interface device 208.

Figure 3:
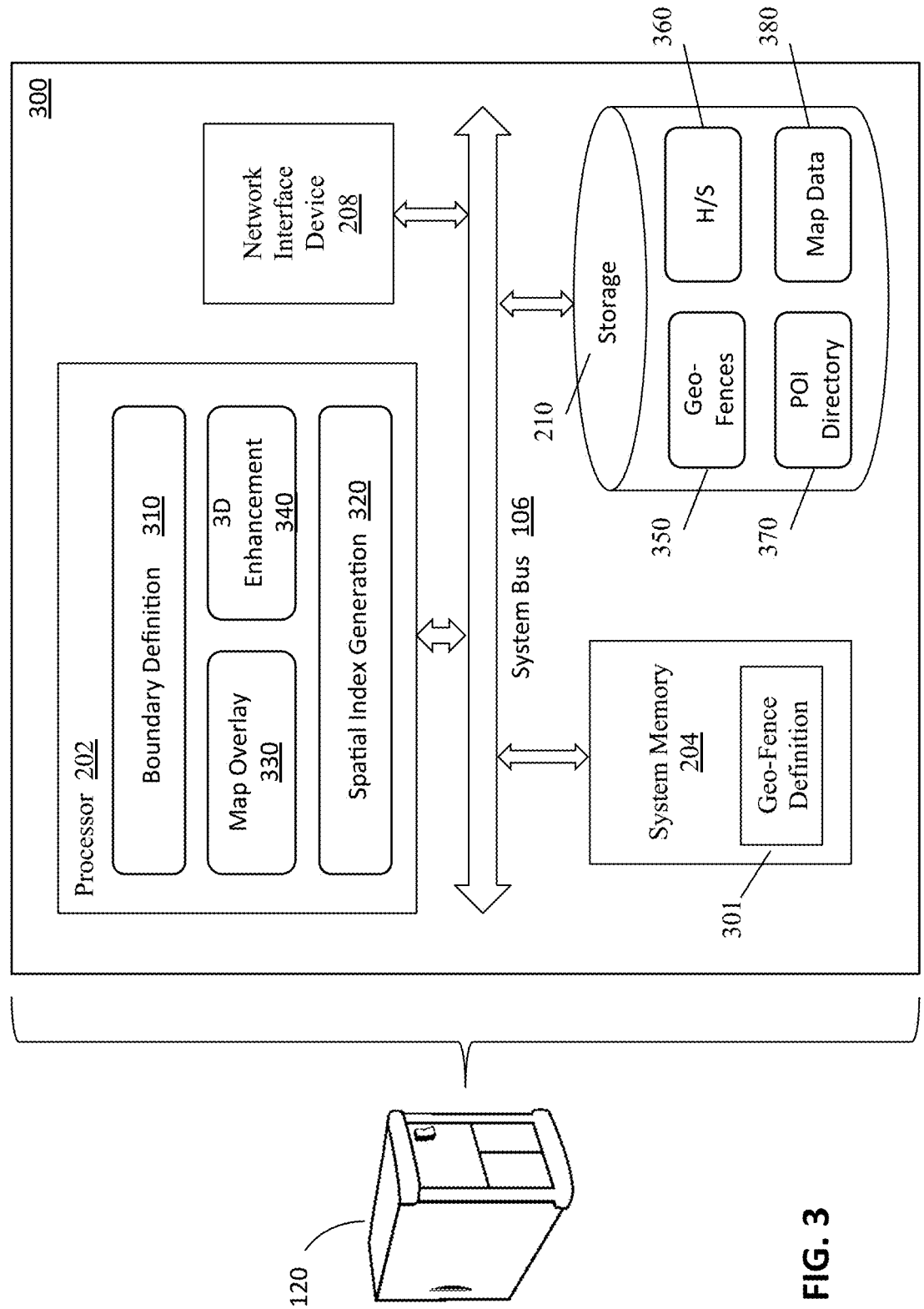
FIG. 3 is a diagrammatic representation of a geo-fence definition system according to certain embodiments.

FIG. 3 is a diagrammatic representation of a geo-fence definition system 300 provided by a computer/server system 120 according to certain embodiments. As shown in FIG. 3, the processor 202 in the computer/server system 120, when executing a geo-fence definition software program 301 loaded in the main memory 204, provides a geo-fence definition system including a boundary definition module 310 and a spatial index generation module 320. The system 300 makes use of a plurality databases storing data used and/or generated by the geo-fence definition system 300, including a database 350 for storing the gen-fences generated by the spatial index generation module 320, a database 360 for storing historical/statistical (H/S) data, a database 370 for storing a Point of Interest (POI) directory, and a database 380 for storing map data. Any or all of these databases can be located in the storage 210, or in another server/computer 120 and/or NAS 121 in the network 100, which the process 202 can access via the network interface device 208.

The boundary definition module defines virtual perimeters of defined areas that mirror real-world geographical areas for mobile advertising. A defined area according to certain embodiments can be a static circle around a business location, e.g. a fence obtained using offline index databases such as InfoUSA (www.infousa.com), which provides a list of businesses and their locations, or areas specified by marketers using predefined boundaries, such as neighborhood boundaries, school attendance zones, or parcel boundaries, etc. The defined areas according to certain embodiments can also be dynamically computed and can have arbitrary shapes that change depending on the time of the day, day of the week, or other variables, as described in co-pending U.S. patent application Ser. No. 13/867,025, filed Apr. 19, 2013, entitled "Method and Apparatus for Dynamic Fencing," which has been incorporated by reference herein.

In certain embodiments, the defined areas include places computed by the boundary definition module 310 using business meta-information and/or geographical information. As shown in FIG. 3, the boundary definition module 310 has access to the (POI) directory (e.g., InfoUSA), which provides a list of POIs and their corresponding brand names, addresses, and geographical locations. The boundary definition module 310 may also have access to the map data 380, which provides information about the surroundings of the POIs in the POI directory. The boundary definition module 310 generates one or more places in the form of, for examples, a set of geographic points defining the perimeters of the one or more places, for each POI of interests based on the POI information.

Figure 4A:
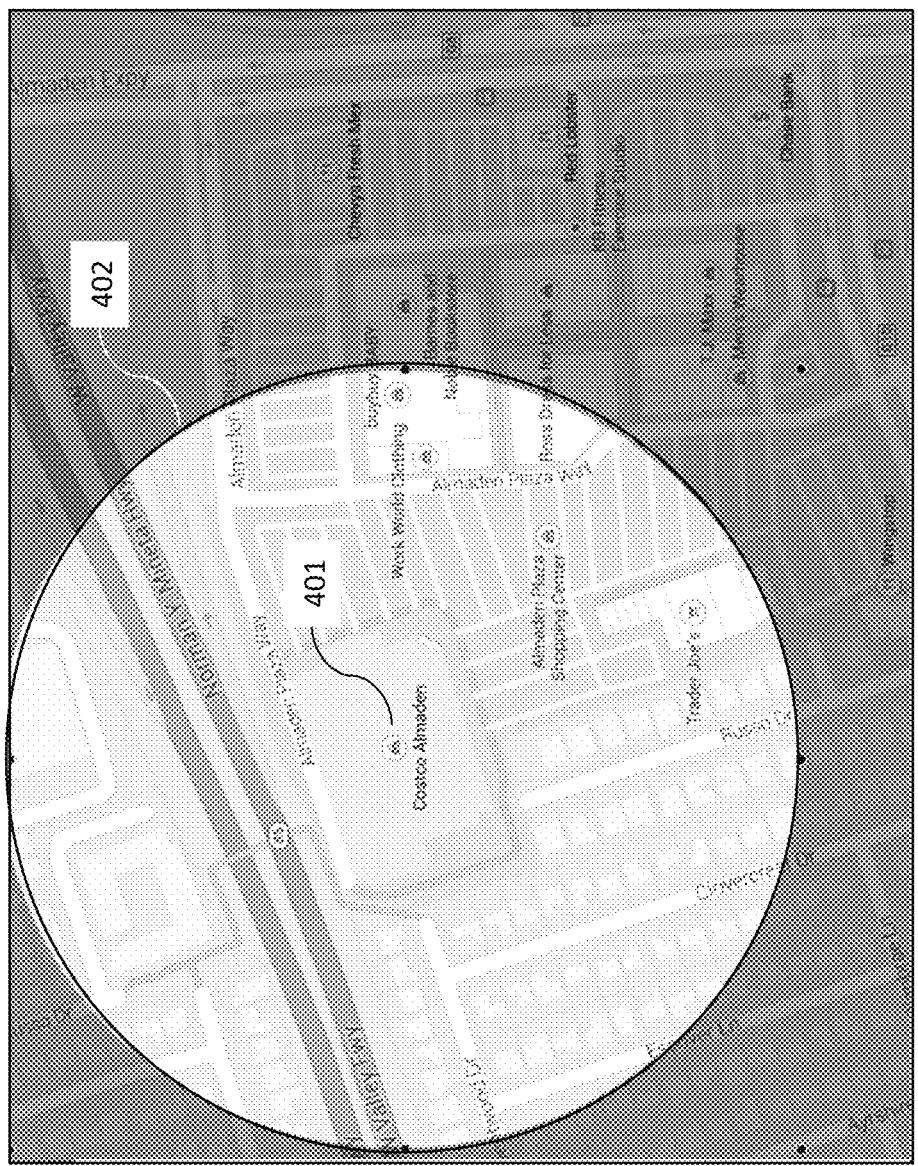
FIG. 4A is a diagrammatic representation a simple geo-fence in the shape of a circle.

In certain embodiments, the boundary definition module 310 generates or defines one or more places for each of a plurality of POIs in consideration of the map data (e.g., Open Street Map) around the POI. For example, as shown in FIG. 4A, a simple geo-fence for the Costco Almaden store without consideration of the map data can be in the shape of a circle 402 around the store location 401, based on the assumption that a user's intent to visit a given POI could be derived from his or her distance from the POI. However, as shown in FIG. 4A, the circle fence encompasses a major highway, a residential area, and areas on the other side of the major highway. Ads served to mobile devices in these areas would most likely be ignored because people living close to the store, people traveling on the highway, and people on the other side of the highway are either already familiar with what the store has to offer or are unlikely to bother to respond to mobile ads related to the store.

Figure 4B:
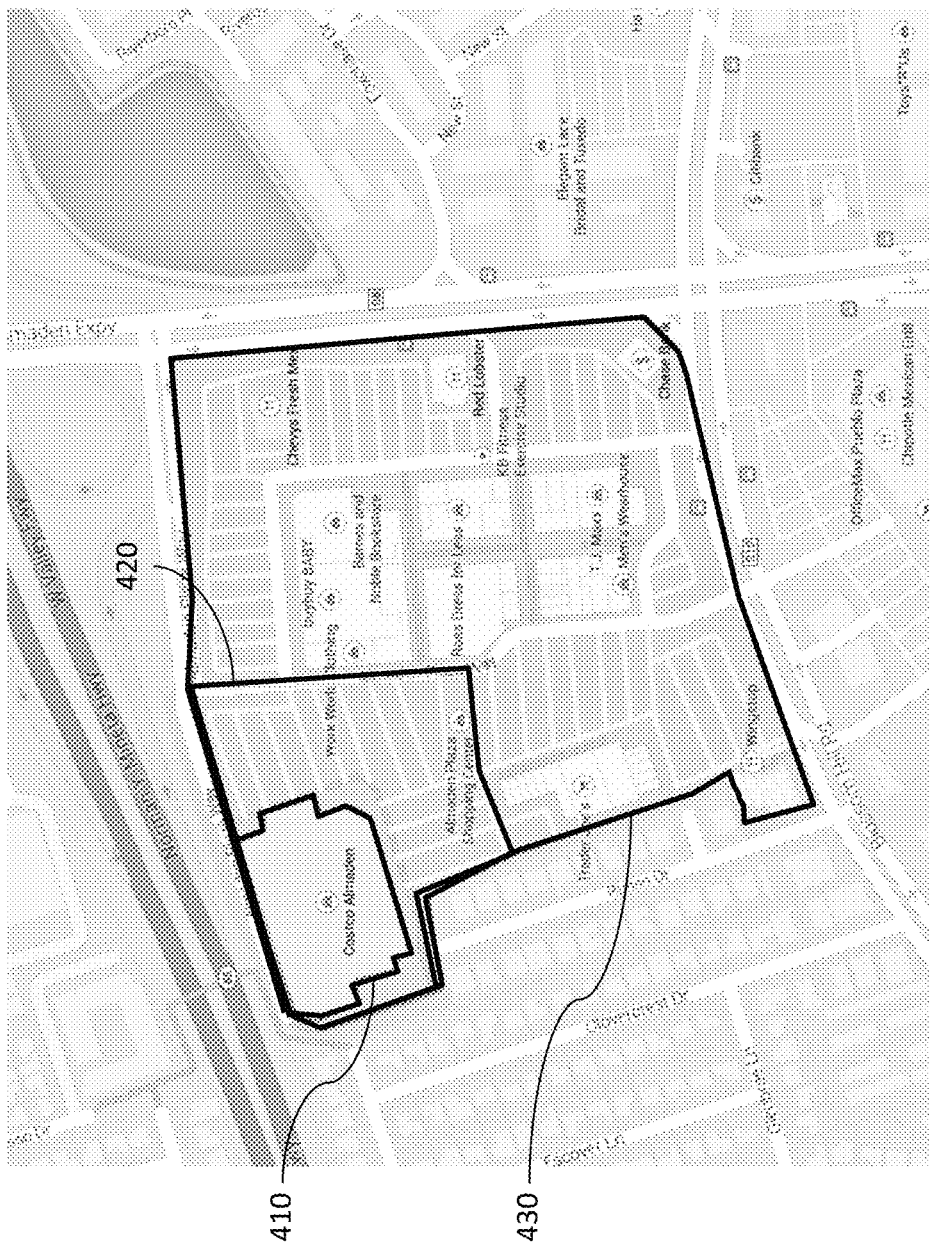
FIG. 4B is a diagrammatic representation of one or more polygon geo-fences defined in conformity with geographical configuration and surroundings of a store according to certain embodiments.

Therefore, instead of geo-fences based on a radius around a centroid of a business location, the boundary definition module 310 according to certain embodiments uses the map data to define places that are of more interests to mobile advertisers. As shown in FIG. 4B, one or more polygons can be defined in conformity with the geographical configuration and surroundings of the store, such as a first polygon 410 around the building of the store, a second polygon 420 around the building and its parking lot, and/or a third polygon 430 around a shopping area or business region including the store and other stores.

In certain embodiments, different types of places may be defined for a POI so that mobile advertisers can offer different ads or different prices for ads delivered to mobile devices that have triggered these different types of places. For example, an ad request associated with a mobile device located inside the first polygon 410 around the building of the store may be more valuable to the store owner or a competing business and thus priced higher than an ad request associated with a mobile device that is in the shopping area (polygon 430) but not inside the store. Or, polygon 430 may be priced higher by the store owner to attract mobile users in the business region than polygon 410, which indicates that the mobile user is already in the store.

In certain embodiments, these three types of places are defined by extracting building polygons, parking lot polygons and land-use polygons from local and national GIS systems. In certain embodiments, some or all of the places can be defined manually with assistance of computer annotation tools and by consulting some external map and/or satellite data to make sure that the geo-fences are aligned with the real building and region boundary information surrounding the intended businesses.

In certain embodiments, the different types of places associated with a business that are offered to the mobile advertisers include, for example, (1) a business center (BC) represented by, for example, a polygon corresponding to the perimeter of the building of the business (e.g., the first polygon 410 in FIG. 4B); (2) a business premise (BP) represented by a polygon corresponding to the perimeter of the business building and the neighboring parking lots (e.g., the second polygon 420 in FIG. 4B); and (3) a business region (BR) or area represented by a polygon corresponding to the perimeter of a shopping center or business or commercial area in which this business is located (e.g., the third polygon 430 in FIG. 4B). If a business center is triggered, it can be reliably inferred that the user is interested in the business by actually visiting it. Triggering of a business premise provides good indication of an intent to visit the business, but not as strong as triggering the business center. If a user triggers a business region, the intent may be regarded as valid but weaker than that from triggering a business premise.

The spatial index generation module 320 generates spatial indices representing the areas defined by the boundary definition module 310 to create geo-fences for storing in the geo-fence database 350, which is a spatial database that aids in the handling of spatial queries, such as how far two points differ, or whether certain point falls within a spatial area of interest. The spatial index generation module can employ conventional spatial indexing methods, and/or the indexing methods described in co-pending U.S. patent application Ser. No. 13/867,029, entitled "Method and Apparatus for Geographic Document Retrieval," Filed Apr. 19, 2013, which has been incorporated herein by reference. FIG. 4C illustrates examples of geo-fences stored in the database 350, according to certain embodiments. As shown, the store Costco in Almaden has three different types of places associated with it—place US/CA/Almaden/BC is a business center (BC), which is a polygon around the store building and represented by spatial index a1, a2, . . . , ai; place US/CA/Almaden/BP is a polygon around the store's larger premise including its parking lot and represented by spatial index b1, b2, . . . , bj; and place US/CA/Almaden/BR is a polygon around the shopping center including the store and other stores and represented by spatial index c1, c2, . . . , ck. FIG. 4C also shows that the store T.J. Maxx has three types of places associated with it, and the store Trader Joe's has at least a business center place associated with it. As shown in FIG. 4C, each geo-fence entry in the database 350 includes the spatial indices associated with the respective place together with other information about the respective place, such as, for example, a name/brand associated with the place, a category of the place, a place identifier identifying a particular locale (e.g., city, district, etc.) for the place, the place type, and/or one or more doc IDs identifying one or more advertisement documents for the name/brand or the place.

Figure 5A:
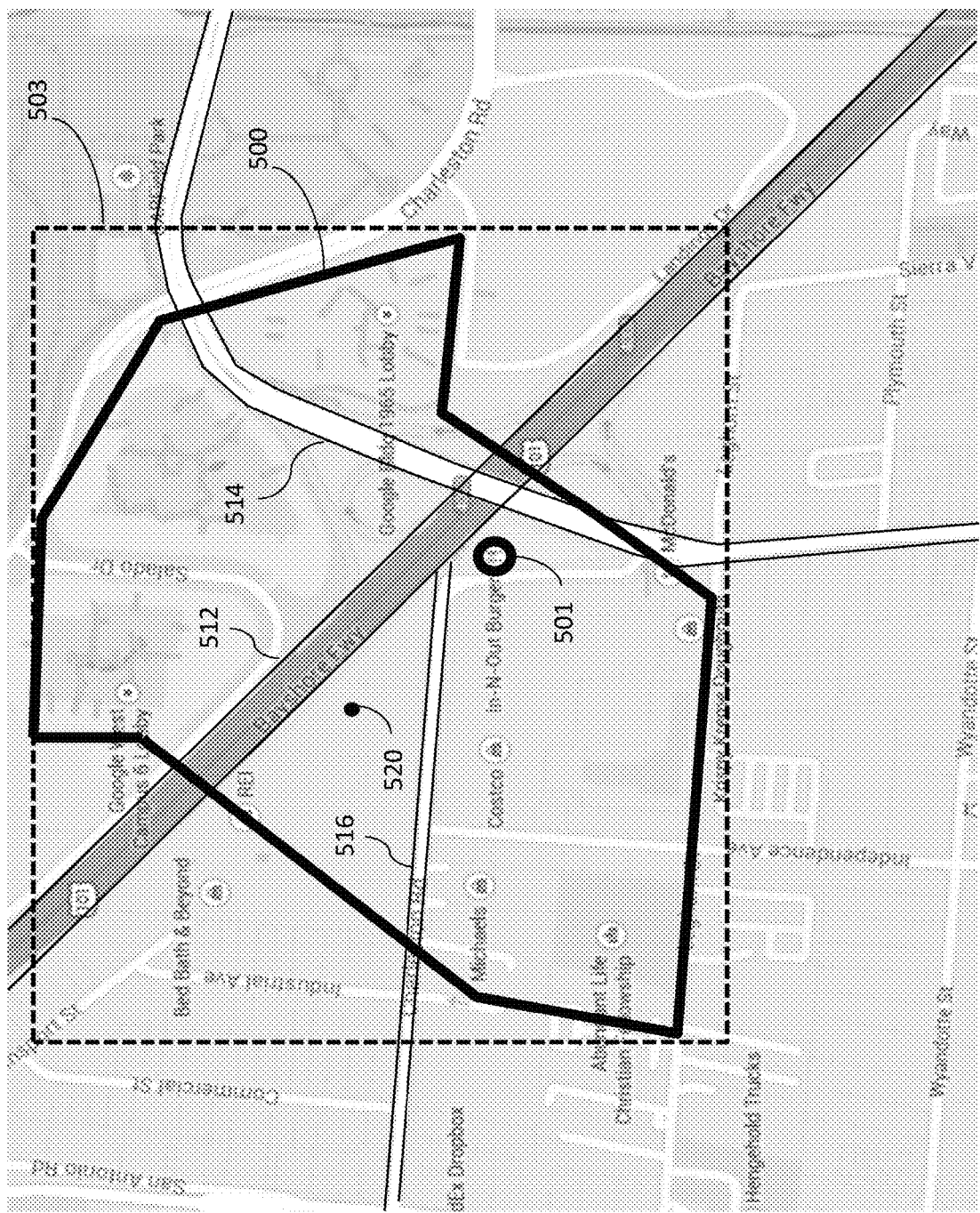
FIG. 5A is a diagrammatic representation of a polygon gen-fence that overlaps with major roads according to certain embodiments.

The geo-fence definition system 300 may further includes a map overlay module 330 that extracts map data for the major roads near a defined geo-fence and overlay the map data on top of the geo-fence to create an enhanced geo-fence. For example, as shown in FIG. 5A, the boundary definition module 310 generates a geo-fence 500 for a business 501, e.g., a restaurant. The geo-fence 500 in this example is a polygon encompassing the restaurant 501 and other businesses around the restaurant 501, because a mobile ad campaign for the business 501 is aimed at attracting mobile users visiting the other businesses or working in an office complex nearby. The ad campaign, however, desires to exclude mobile users traveling on major roads 512, 514 and 516 in the geo-fence 500. The rationale is that these mobile users could be traveling at high speeds and are less likely to respond to the mobile ads for the restaurant by circling back to the restaurant.

Figure 5B:
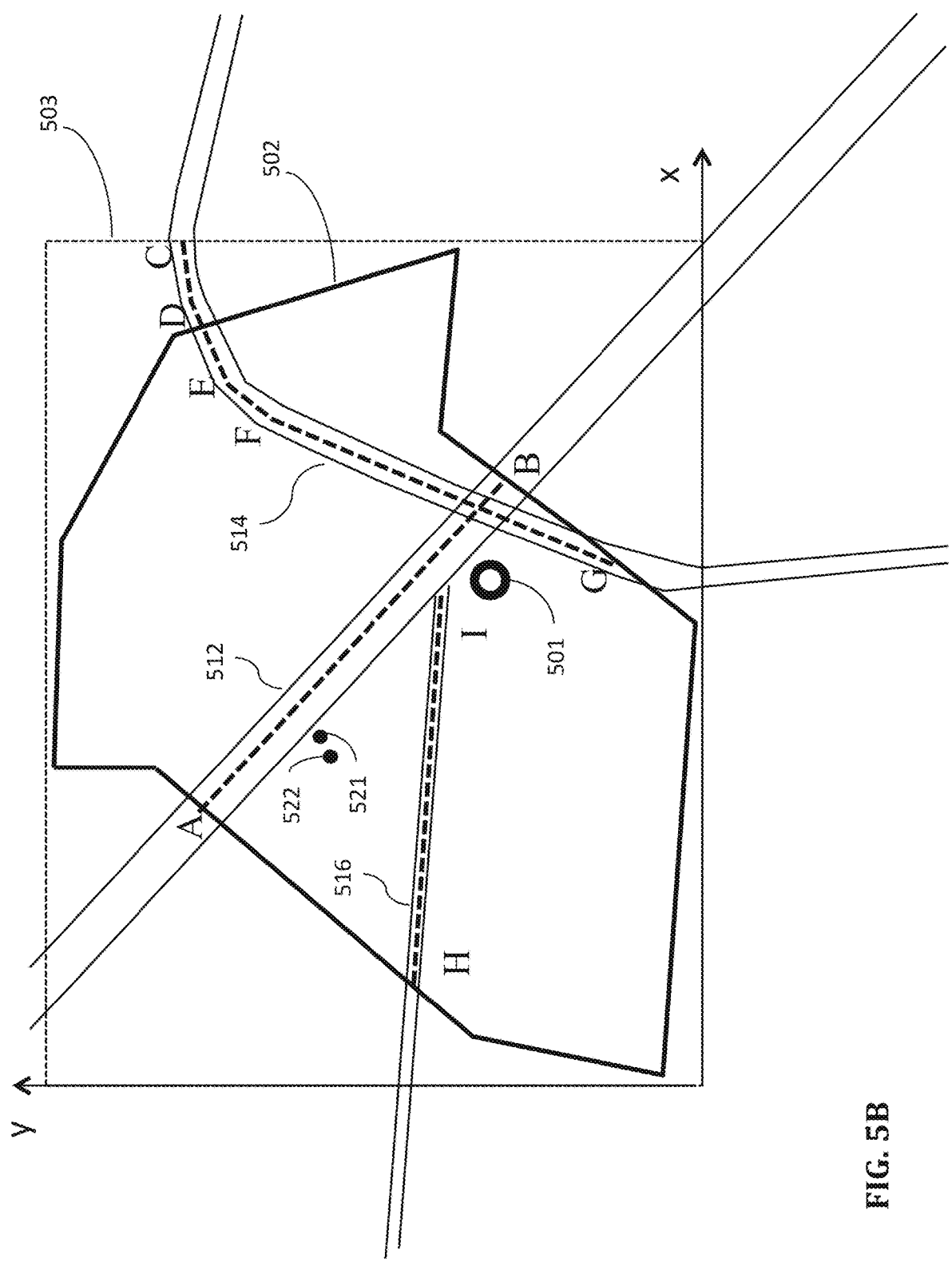
FIG. 5B is a diagrammatic representation of a virtual rectangle created to contain the geo-fence in FIG. 5A according to certain embodiments.
Figure 5C:
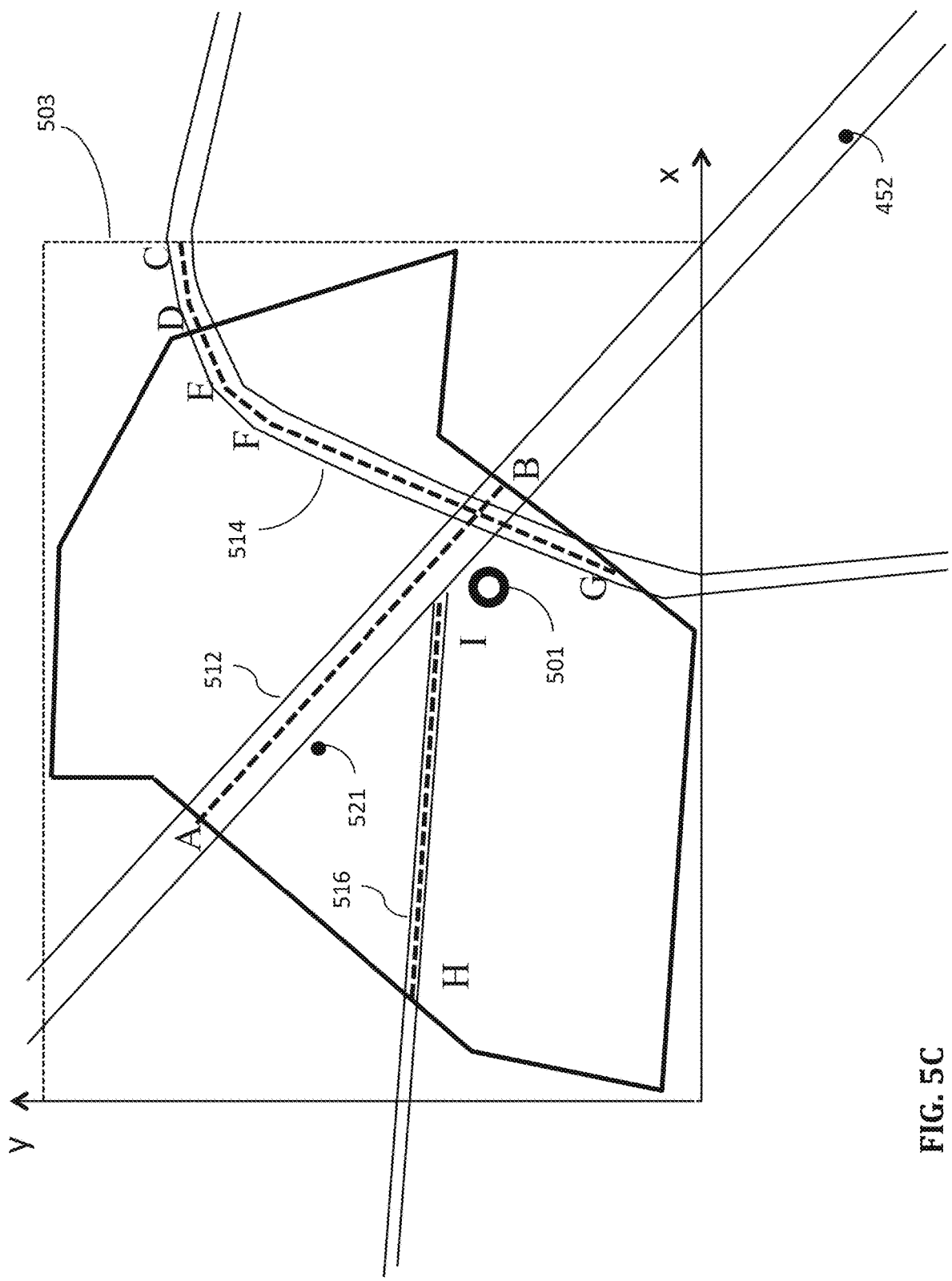
FIG. 5C is a diagram showing parts of major roads overlapping with the virtual rectangle being translated into line segments, according to certain embodiments.

Thus, in certain embodiments, the map overlay module 330 creates a virtual rectangle 503 containing the geo-fence 500. The rectangle 503 can be the smallest rectangle containing the whole geo-fence 500, as shown in FIG. 5B. The map overlay module 310 then retrieves map data associated with major roads, e.g., roades 512, 514, and 516, that overlap with the virtual rectangle 503, and translates the map data into line segments. As shown in FIG. 5C, the parts of the major roads 512, 514, and 516 overlapping with the virtual rectangle 503 are translated into line segments AB, CD, DE, EF, FG, and HI. The geo-fence 500, together with the line segments, form an enhanced geo-fence for the restaurant 501, which can be used assess whether a mobile user associated with a ad request could be a traveler on one of the major roads.

Figure 5D:
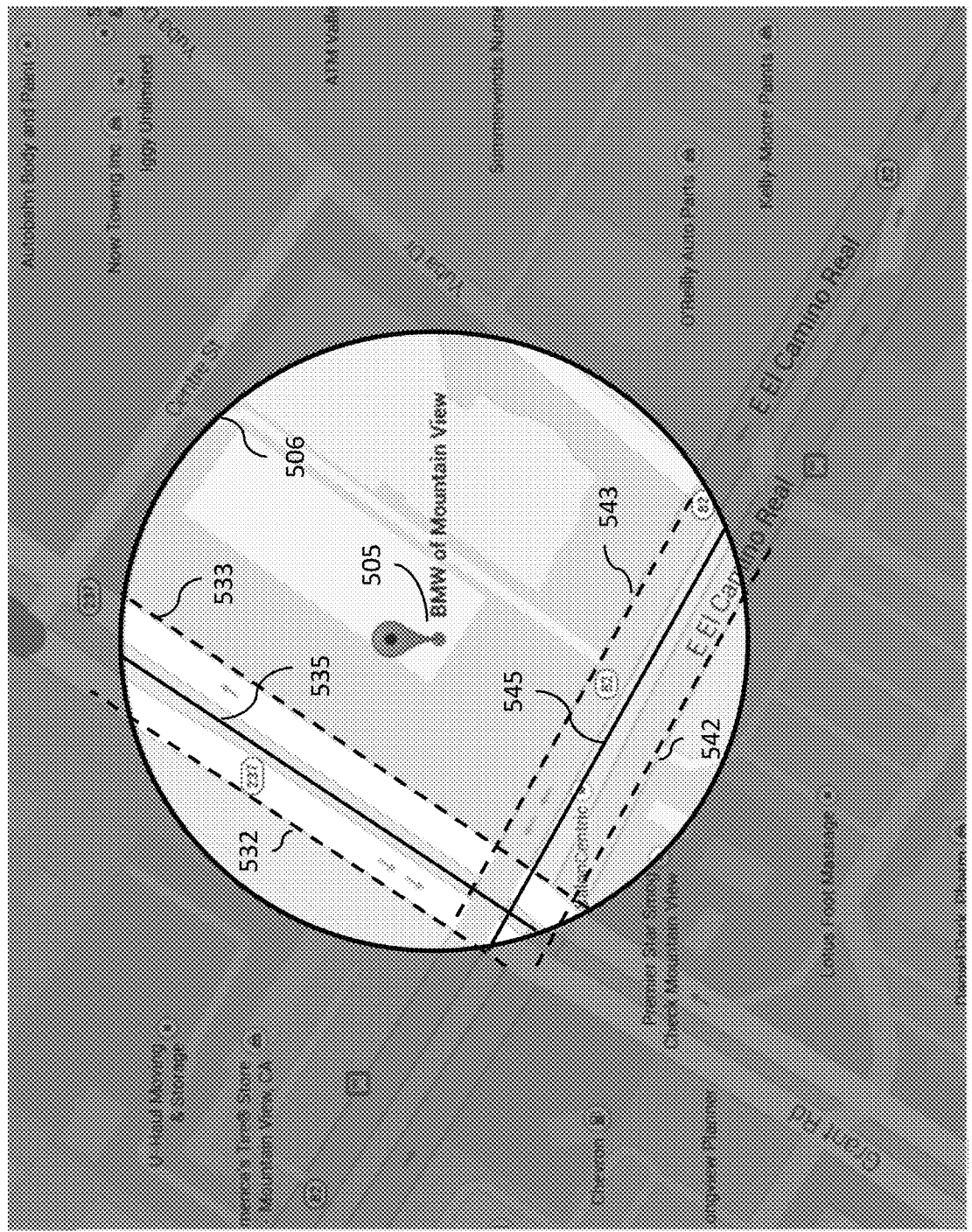
FIG. 5D is a diagrammatic representation of an enhanced geo-fence including a circle drawn around a business and line segments drawn along edges and center dividers of major roads overlapping with the circle, according to certain embodiments.

Instead of, or in addition to, line segments drawn along or near the center divider of a major road, a major road can also be represented by a road band using by, for example, line segments drawn along opposite edges of the road. As shown in FIG. 5D, an enhanced geo-fence for a business 505 includes a circle 506 drawn around the business 505 and line segments 532, 533, 542, and 543. Line segments 532 and 533 are drawn along the edges of Hwy 237 on two opposite sides of the center divider 535 of Hwy 237, while line segment 542 and 543 are drawn along the edges of Hwy 82 on two opposite sides of the center divider 545 of Hwy 82. Thus, a mobile device located on a road band of a major road can be considered as traveling along the major road. Also, depending which side of a high way a mobile device is located, its distance from the high way can be measured from the edge of the highway on the same side.

Figure 6A:
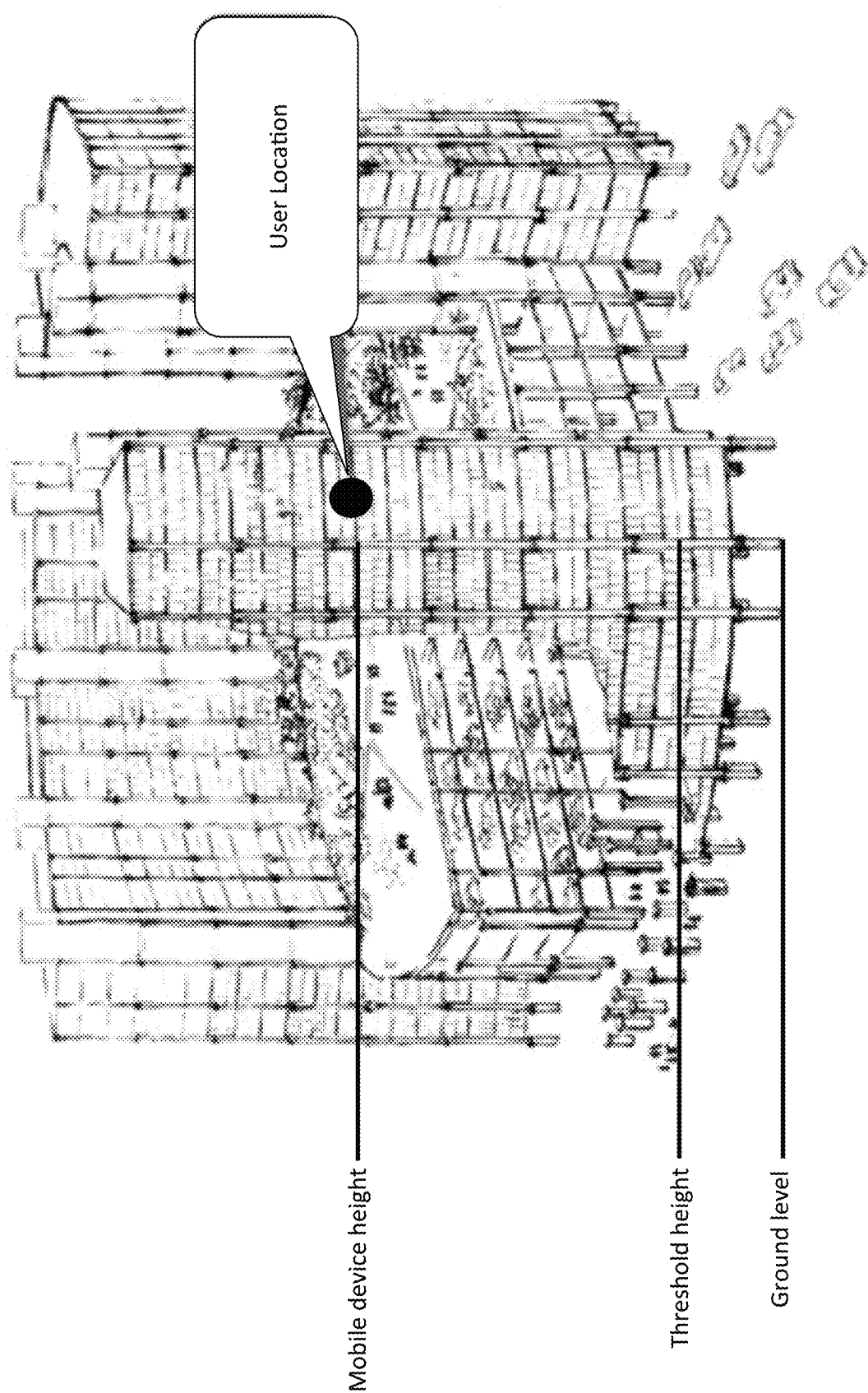
FIG. 6A is a diagrammatic representation different kinds of businesses stacked on top of each other in a high-rise building complex.
Figure 6B:
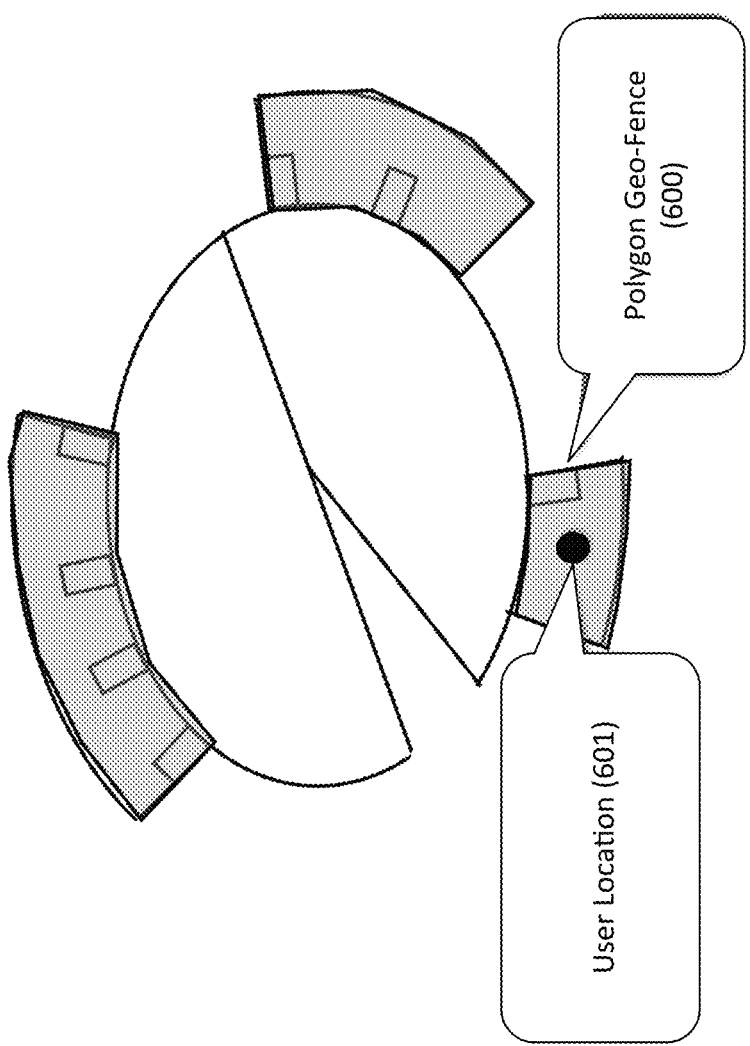
FIG. 6B is a diagrammatic representation of 2-D polygon geo-fences triggered by a mobile user location on the $10^{th}$ floor of a high-rise complex according to certain embodiments.

FIGS. 4A-5D illustrate examples of two-dimensional (2D) geo-fences, which are useful in location-based advertising where businesses occupy separate geographical areas. They are less suitable when different kinds of businesses are stacked on top of each other in a high-rise building complex, such as the one illustrated in FIG. 6A. For example, as shown in FIG. 6B, the 2-D polygon geo-fences 600 triggered by a user location 601 on the $10^{th}$ floor of a high-rise complex shown in FIG. 6A cannot be easily used to select an advertisement for a particular business occupying a particular floor of the building complex when multiple businesses in the building complex are targeting the same geographical fence 600.

Figure 6C:
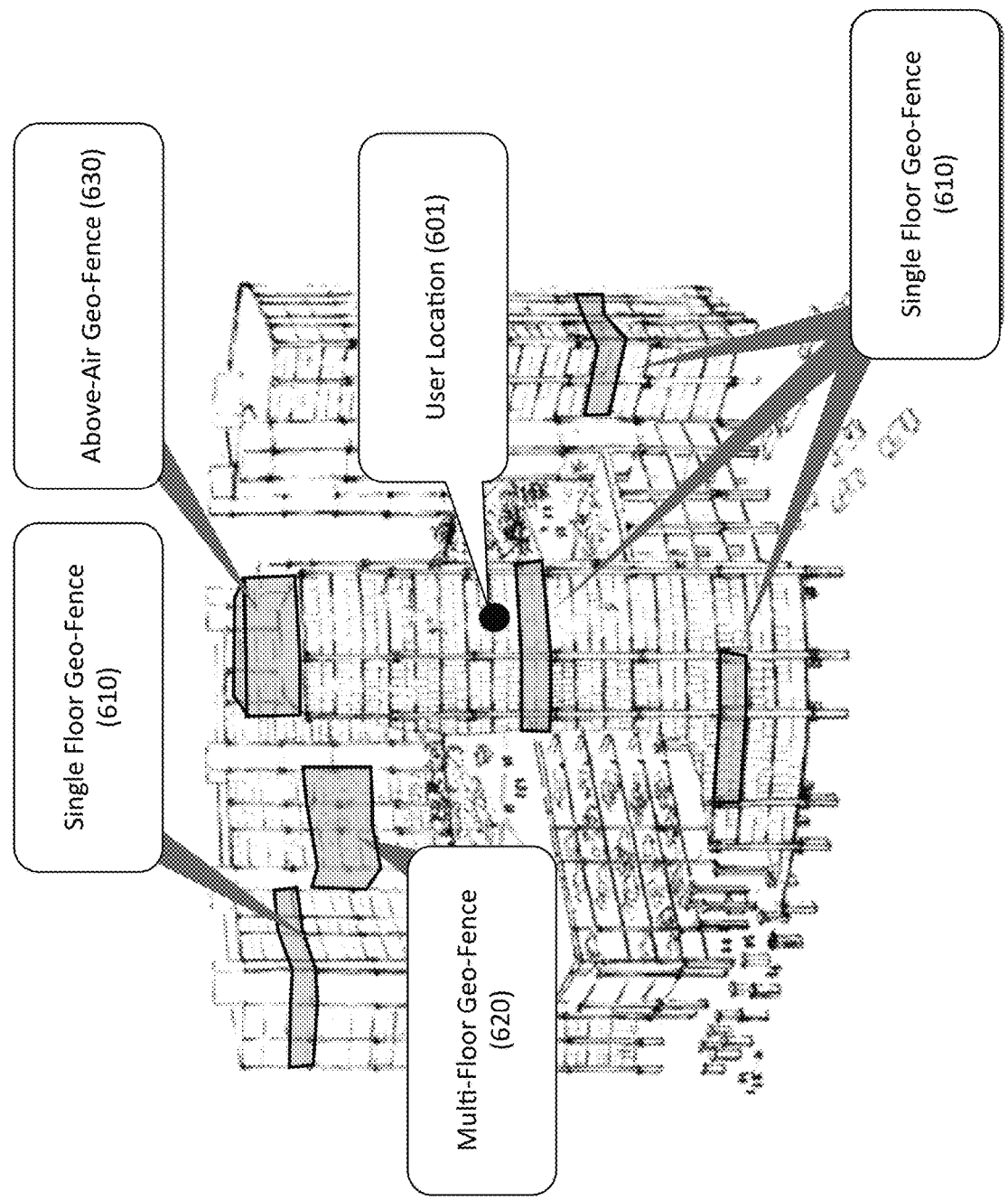
FIG. 6C is a diagrammatic representation of 3-D enhanced geo-fences that mirror single-floor, multi-floor, and/or above-air spaces or volumes, respectively, in or around a high-rise building complex according to certain embodiments.

In certain embodiments, the geo-fence definition system 300 further includes a 3-D enhancement module 340 that provides enhanced geo-fencing solutions to targeted three-dimensional (3-D) positions. As shown in FIG. 6C, instead of, or in addition to, the 2-D polygon geo-fences in FIG. 6B, the 3-D enhancement module 340 computes 3-D enhanced geo-fences 610, 620, and/or 630, that mirror single-floor, multi-floor, and/or above-air spaces or volumes, respectively, in or around the building complex.

In certain embodiments, the 3-D geo-fences are digitally fenced volumes (or campaign spaces), such as three-dimensional polygon fences that wrap around real-world objects (e.g. parts of buildings, underground spaces, mountain summits, etc.). They can be volumes/spaces specified by marketers, such as floors in multi-story shopping malls, etc as shown in FIG. 6C. For example, a simple 3-D geo-fence may be represented by a 2-D stamp (e.g., its projection onto the ground), which may be in the form of a 2-D polygon or an arbitrarily-shaped 2-D area, and an altitude span (e.g., from the 3rd floor to the 5th floor of a building), both of which can be dynamic depending on the time of the day, day of the week, etc. For example, sections of a building can be dynamically or otherwise included and excluded by an ad campaign according to campaign specifications.

Figure 6D:
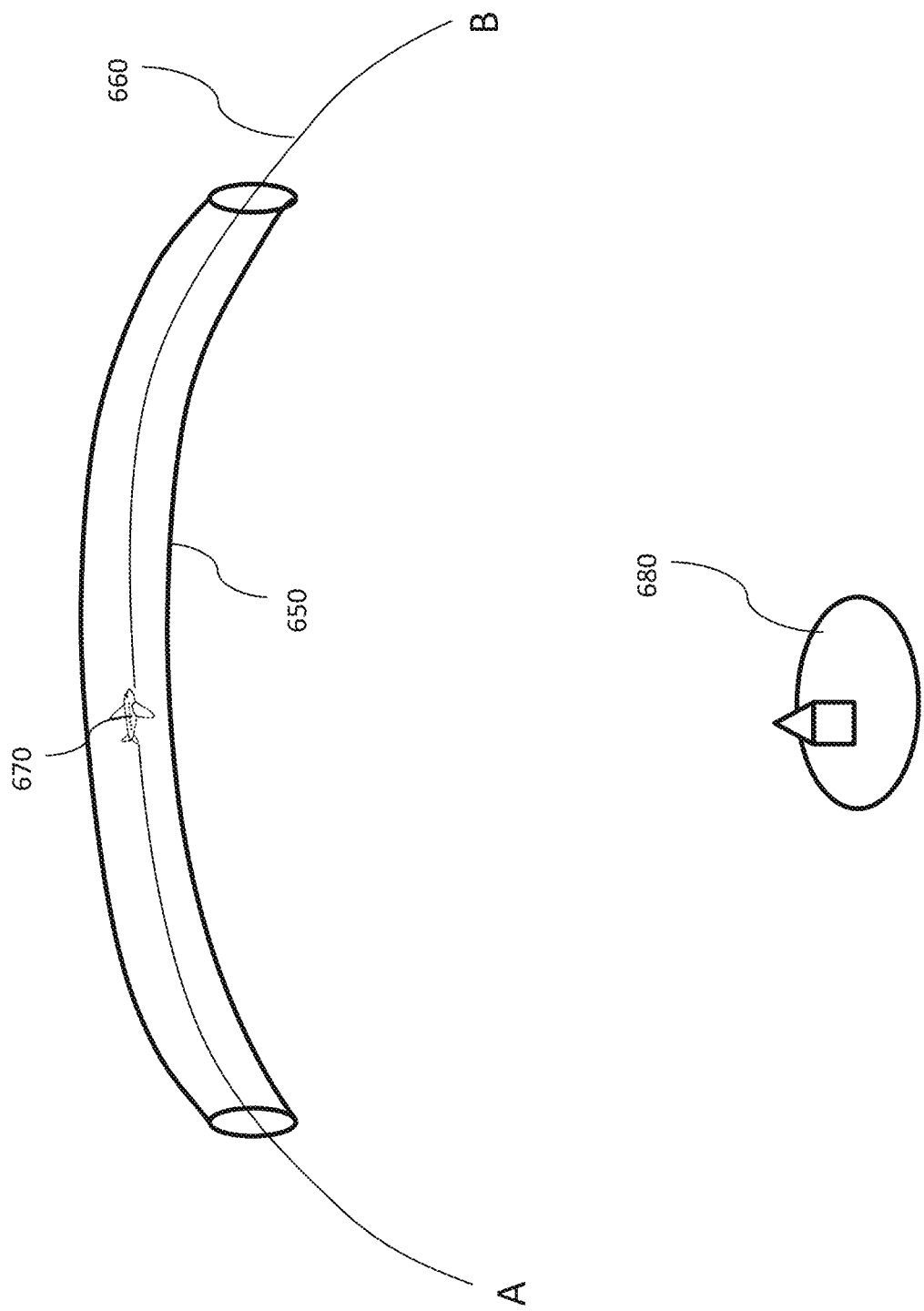
FIG. 6D is a diagrammatic representation of a virtual tube geo-fence stretching along part of or the entire length of a flight path of a commercial flight according to certain embodiments.

In certain embodiments, the 3-D enhancement module 340 may determine for each POI for which geo-fences are being generated, whether the particular POI is suitable for 3-D geo-fencing. Such determination may be based on whether the POI is on a particular floor of a multi-story building or whether an ad campaign for or against the POI has requested 3-D geo-fencing. In certain embodiments, even a POI that is not situated in high-rise buildings may desire 3-D geo-fencing. For example, a business may desire to target mobile users on flights from city A toward city B. In such cases, as shown in FIG. 6D, the 3-D geo-fences may include a virtual tube 650 stretching along part of or the entire length of a flight path 660 of one or more of the flights flying from city A to city B. Thus, a mobile device 670 in an airplane in the flight path 660 would trigger the 3-D geo-fence 650 instead of, or in additional to, a 2D geo-fence 680 for a business on the ground under the airplane.

Figure 7:
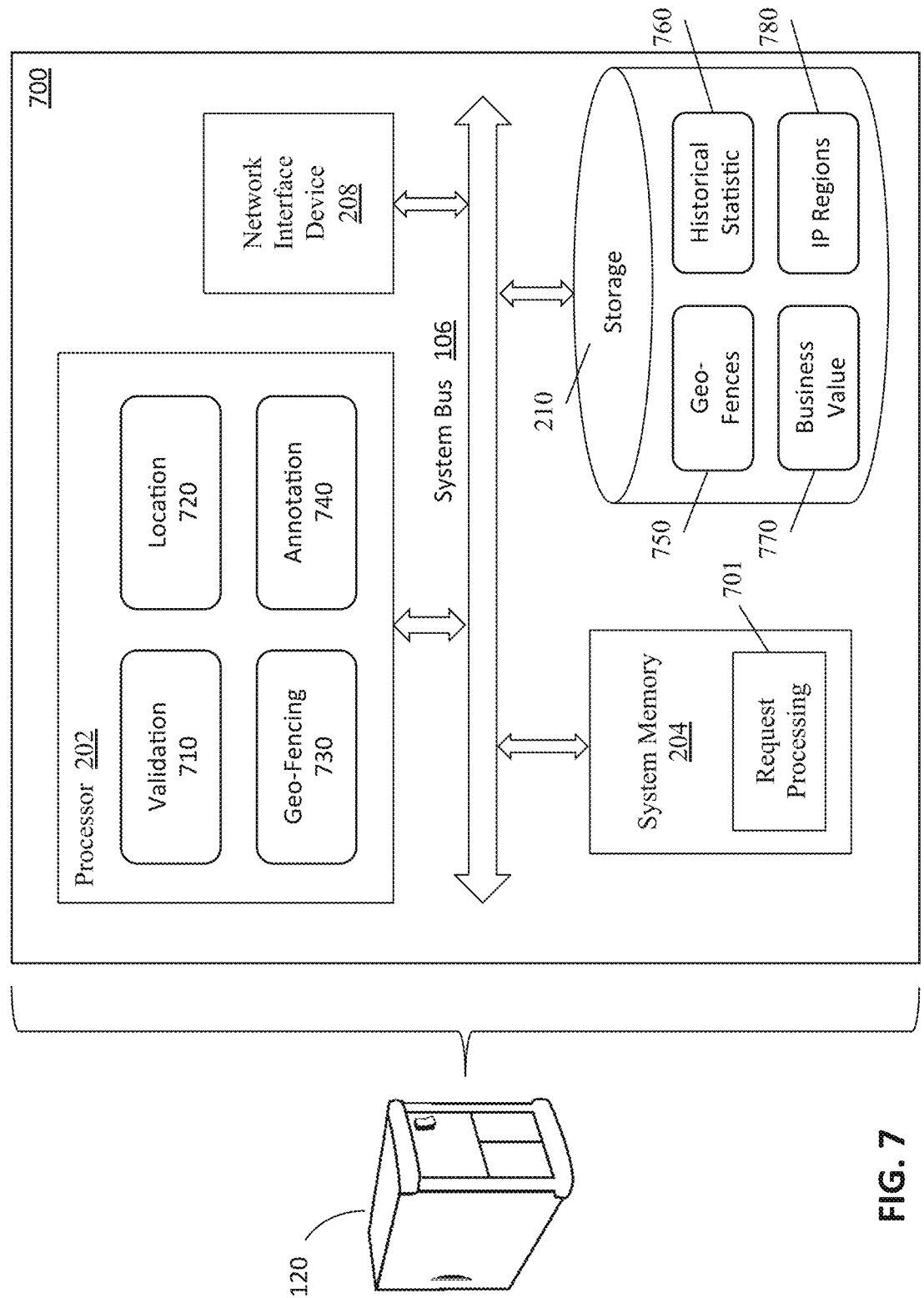
FIG. 7 is a diagrammatic representation of a request processing system that processes mobile ad requests received from a network according to certain embodiments.

FIG. 7 is a diagrammatic representation of a request processing system 700 provided by a computer/server system 120 that processes mobile ad requests received from the network 100 according to certain embodiments. As shown in FIG. 7, the processor 202 in the computer/server system 120, when executing an ad request processing software program 701 loaded in the main memory 204, provides the request processing system 700 including a validation module 710, a location module 720, a geo-fencing module 730, and an annotation module 740. The system 700 makes use of a plurality databases storing data used and/or generated by the request processing software program 701, including a database 750 for storing the geo-fences generated by the geo-fence definition system 300, a database 760 for storing historical/statistical data, a database 770 for storing business value information, and a database 780 for storing IP regions corresponding to respective IP addresses of a collection of WiFi hotspots 135 and cellular towers 101a. Any or all of these databases can be located in the storage 210, or in another server/computer 120 and/or NAS 121 in the network 100, which the process 202 can access via the network interface device 208.

Figure 8A:
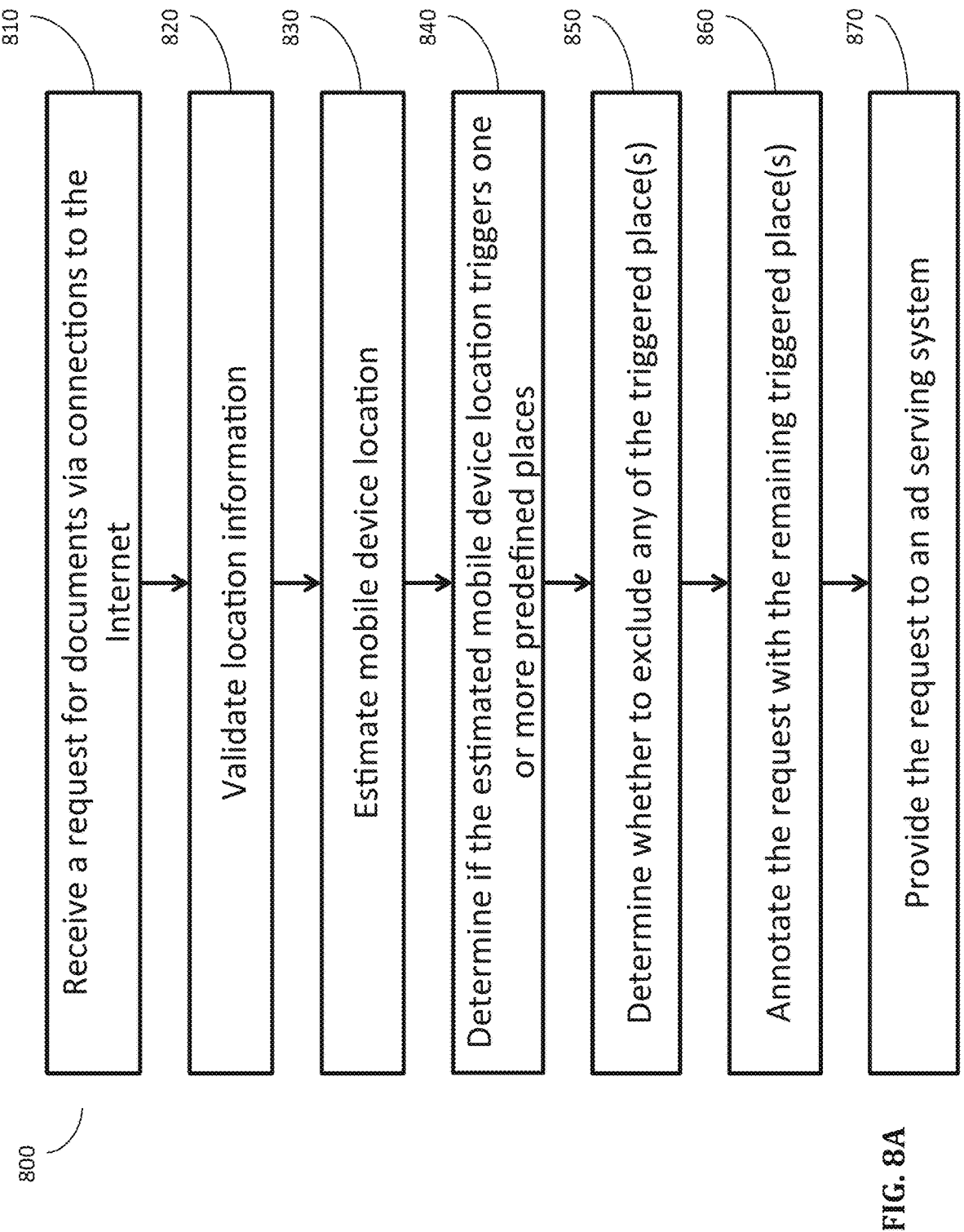
FIG. 8A is a flowchart illustrating a method performed by the request processing system according to certain embodiments.

FIG. 8A is a flowchart illustrating a method 800 performed by the request processing system 700 according to certain embodiments. As shown in FIG. 8A, the system 700 receives (810) an ad request via connections 208, 208a to a network (e.g., the Internet). The ad request may come from a mobile publisher or any web service provider, with whom a mobile user has initiated interaction using his/her mobile device 130 via one or more web services or applications provided by the mobile publisher. The ad request may also be initiated by a software development kit (SDK) provided by a supply side platform (SSP). The ad request may also be provided by, for example, an ad middleman, an ad exchange, or any ad service provider. The ad request includes mobile device location information including a plurality of location components, such as latitude and longitude coordinates (LL), IP addresses (IP), postal or zip codes (ZC), and/or city-state names (CS), etc, in addition to other information, as discussed in further detail below with reference to FIGS. 9A-9C. The ad request may also include an altitude coordinate, which can be used to indicate an elevated location of the mobile device.

In certain embodiments, the validation module 710 validates (820) the location information by checking the validity and consistency of the location components and by weeding out any invalid location component(s). Generally, the LL is usually believed to be the most useful location component. However, when a user doesn't allow his/her location information to be known, mobile applications typically provide only coarse location data in the form of, for example, an IP address, a ZC (e.g. entered by the user at the time of registration), or CS. Thus, mobile applications and publishers frequently provide LLs obtained from geo-coding software, which translates ZC, CS, and other points of interests into one representative LL. In one embodiment, such representative LLs are categorized as "bad LLs". A bad LL can be, for example:

1. A centroid of a ZC/CS
2. Any fixed point on a map (e.g. (0,0) or an arbitrary location)

In certain embodiments, the validation module 710 weeds out the bad LL's, so that location data with bad LL's are not provided to the next stage processing in the system 700, by using the techniques disclosed in commonly owned U.S. Patent Application entitled "System and Method for Deriving Probabilistic Mobile User Locations," filed on even date herewith.

The location module 720 estimates (830) the location of the mobile device from the ad request and generates location data to represent an estimated mobile device location, which may be a geographical point or one or more probably areas or regions the mobile device is estimated to be in. The geo-fencing module 730 queries the geo-fence database 750 with the location data to determine (840) whether the location data triggers one or more predefined places in the database 750. The geo-fencing module 730 may further determine (850) whether any of the triggered place(s) should be excluded or discarded, as discussed in further detail below. The annotation module 740 annotates (860) the ad request with the triggered place(s), as discussed in further detail below. The annotated request is provided to an ad serving system, such as the ad serving system 1900 described below, which can be in the same computer/server system 120 or a different computer/server system 120 in the network 100. The ad serving system can be an ad server, an ad exchange or market place. The system 700 transmits the annotated ad request to the ad serving system via the network interface device 208 if the ad serving system is in a different computer/server system.

Figure 8B:
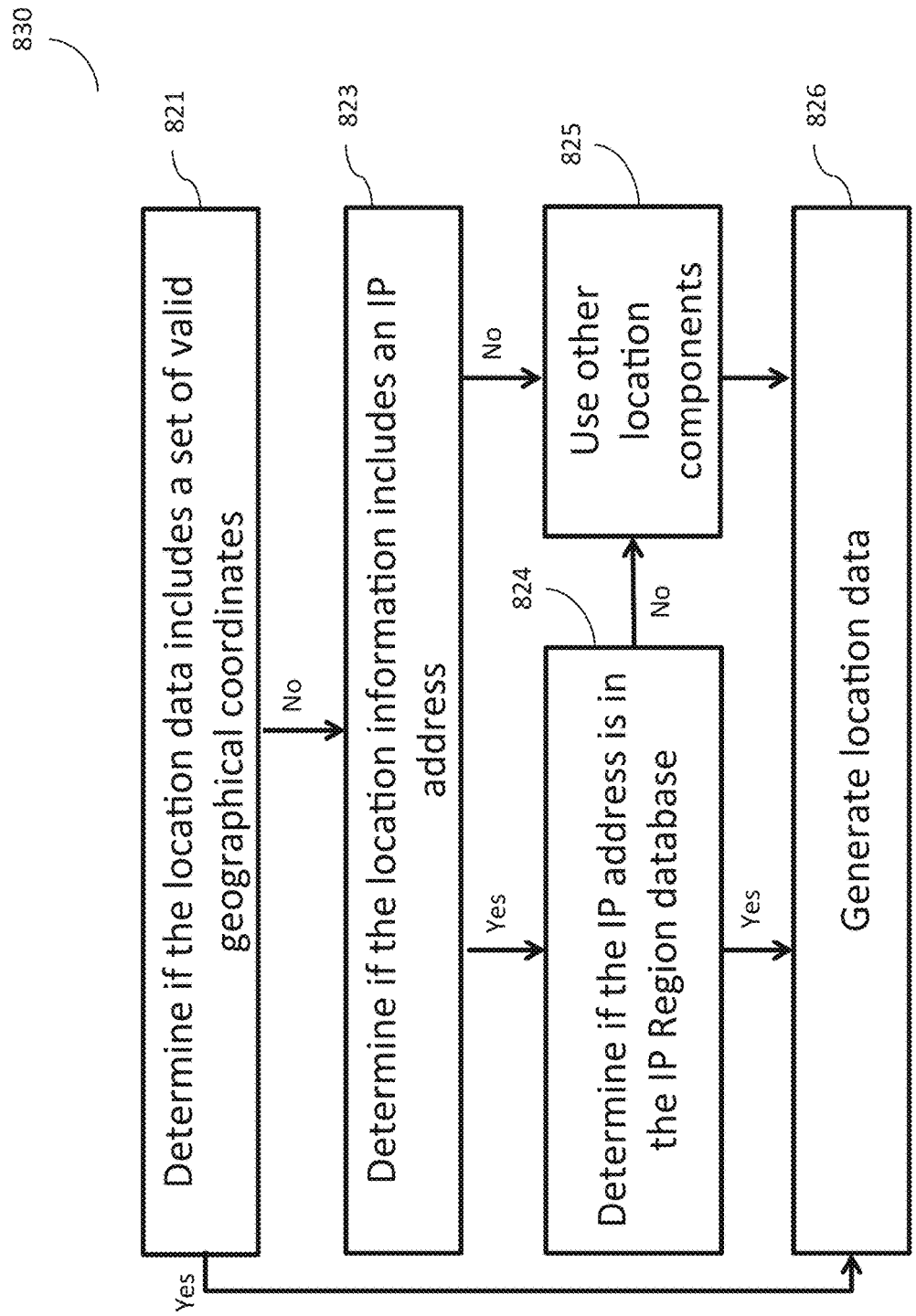
FIG. 8B is a flowchart illustrating a location process to generate location data according to certain embodiments.

FIG. 8B is a flowchart illustrating a location process 830 performed by the location module (720) to generate (830) the location data. As shown in FIG. 8B, the location module determines (821) whether the validated location components include a set of geographical coordinates (e.g., LL), and whether the set of LL is valid or geo-precise LL. If the set of LL is determined to be valid or geo-precise LL (i.e., true LL), the location module 720 would use the LL as the location data to represent an estimated mobile device location. On the other hand, if the validated location components do not include a set of LL or the set of LL is not true LL, the location module 720 determines (823) whether the validated location components include an IP address. If the validated location components include an IP address, the location module then determines (824) if the IP address is in the IP region database 780. If the IP address is in the IP region database 780, the location module generates (826) the location data using a derived IP region associated with the IP address in the IP region database 780. The location data may include geographical points representing the IP region itself or its center location with some function of the inverse of a size of the IP region as a confidence factor. On the other hand, if the location data does not include an IP address or the IP address is not found or associated with a derived IP region in the IP region database, the location engine would use (825) other location components to generate (826) location data, or use external IP vendor databases to resolve an IP to other location components first and then use (825) the other location components to generate (826) location data. In certain embodiments, the location data generated using the other location components include one or more weighted probable areas, as disclosed in commonly-owned U.S. patent application Ser. No. 13/867,021, filed Apr. 19, 2013, entitled "Method and Apparatus for Probabilistic User Location," which has been incorporated herein by reference in its entirety.

Figure 8C:
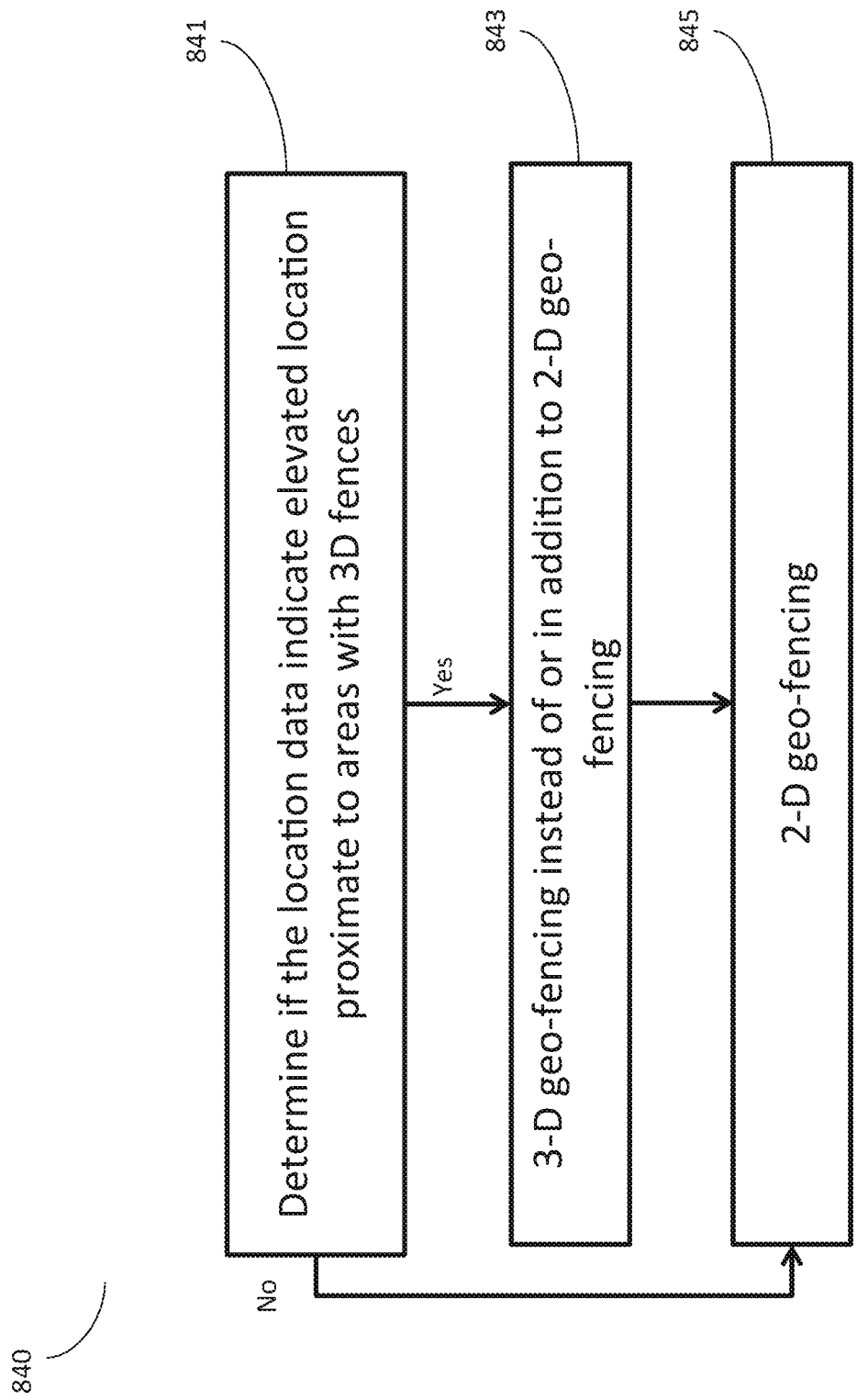
FIG. 8C is a flowchart illustrating a geo-fencing process to determine whether the location data triggers one or more predefined places in a geo-fence database according to certain embodiments.

FIG. 8C is a flowchart illustrating a geo-fencing process 840 performed by the geo-fencing module 730 to determine (840) whether the location data triggers one or more pre-defined places in the database 750. As shown in FIG. 8C, the geo-fencing module 730 may determine (841) whether the location data indicate that the mobile device 130 is at an elevated location that is proximate to geographical areas where 3D geo-fences are more suitable (e.g., commercial areas with highrise buildings). If the true, the geo-fencing module 730 would try to find 3-D geo-fence(s) in the database 750, which may enclose or overlap with the estimated mobile device location represented by the location data. If not, the geo-fencing module would try to find 2-D geo-fence(s) in the database 750, which may enclose or overlap with the estimated mobile device location represented by the location data. The 2-D or 3-D geo-fence(s) thus found are referred to as being triggered by the location data.

Figure 8D:
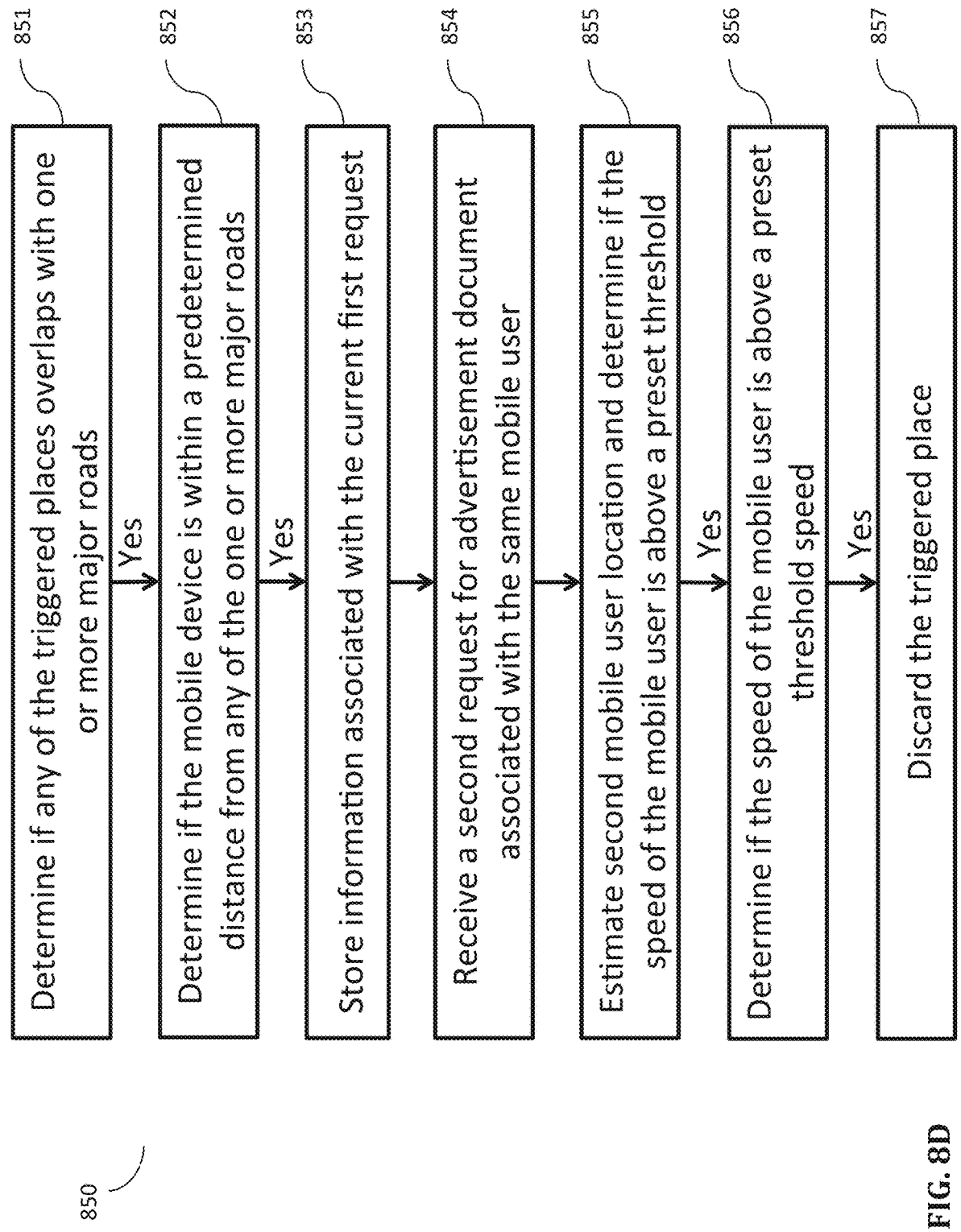
FIG. 8D is a flowchart illustrating a process for determining whether any of the triggered geo-fences should be excluded or discarded according to certain embodiments.

FIG. 8D is a flowchart illustrating a process 850 for determining whether any of the triggered geo-fences should be excluded or discarded according to certain embodiments. For example, as shown in FIG. 8D, the geo-fencing module 730 may determine (851) whether any of the triggered geo-fences overlaps with major roads, and may further determine (852) whether the mobile device 130 could be traveling on one of the major roads. This can be done, for example, by determining whether the location data indicate that the mobile device is within boundaries set for any one of the one or more major roads, or within a predetermined distance from any of the one or more major roads. In certain embodiments, further steps are taken to verify that the mobile device is traveling on a major road. For example, information such as location data and a time stamp associated with the current ad request is stored, and used together with the location data and time stamp of a subsequent request associated with the same device to determine a speed of the mobile device. The triggered geo-fence overlapping with a major road can be excluded or discarded if it is determined that the mobile device is traveling on the major road. Or, if an ad campaign actually targets the mobile devices traveling on the major road and a different geo-fence for that ad campaign would be attached to the ad request.

Figures 9A, 9B, 9C:
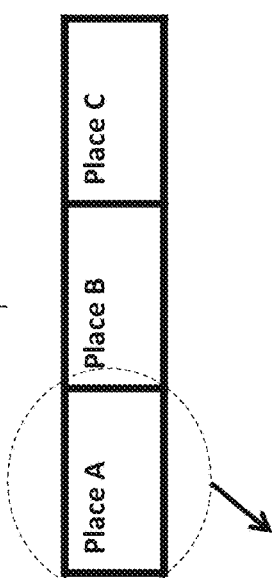
FIGS. 9A-9C are block diagrams illustrating some of the content of an ad request at different stages of processing by the request processing system according to certain embodiments.

In certain embodiments, as shown in FIG. 9A, the ad request 901 received from the Internet by the request processing system 700 includes other information as well as the location information, such as information about the the mobile device and/or a mobile user associated with the mobile device, a time stamp indicating the time of the ad request (e.g., day, hour, minute, etc.), one or more keywords suggesting types of ads for returning to the mobile device, and/or other information associated with the mobile user, the mobile device, and/or the sender of the ad request. In certain embodiments, the location module 720 derives location data from the ad request and replaces the location information in the ad request with the location data to generate a modified ad request 902, as shown in FIG. 9B. The location module 720 may further convert the location data into spatial index representing the same, for ease of use by the geo-fencing module 730.

In certain embodiments, if the location data trigger a pre-defined place or geo-fence, the annotation module 740 annotates the ad request 901 by attaching the triggered place to the ad request or by replacing the location information in the ad request 901 or the location data in the modified ad request 902 with the triggered place, as shown in FIG. 9C. In some cases, the location data can trigger multiple places. For example, as shown in FIG. 4B, an ad request that triggers the BC place 410 of Costco Almaden also triggers the BR place 430 of any of the stores in the same business region. Thus, the ad request may be annotated with the BC place of Costco Almaden and the BR place of one or more other stores in the same business region. As shown in FIG. 9C, each of the one or more places or geo-fences includes either or both of a business name and a brand name, with which the place is associated. For some businesses, the business name and the brand name are the same so only one is required. Each of the one or more places may also include a category of the products or services (e.g., grocery, general merchandise, park/recreation, sports, home improvement, etc.) associated with the business/brand name, and a location of the place (e.g., country/state/city), and a place type (e.g., BC, BP, or BR), some or all of which can be included in the annotated ad request 910. In certain embodiments, a places or geo-fences may also includes a suggested price or a threshold price for sending an ad to the mobile device or for bidding for an ad to be sent to the mobile device, as discussed in further detail below.

In certain embodiments, a trigger accuracy is computed and is attached to the place to give mobile advertisers another metric on which to decide whether to bid for the supply and how to price their bids accordingly. The trigger accuracy may be measured by the confidence factor of the estimated mobile device location and/or by the relative proximity of the mobile device from a centroid of the place vs. from the closest edge of the place, or a percentage of the portion of the probable regions of the mobile device overlapping the place. Thus, an ad request associated with a mobile device found to be very close to the edge of the place or whose one or more probable regions barely overlap with the place can be priced differently from an ad request associated with a mobile device found to be very close to the centroid of the place or its one or more probable regions substantially overlap with the place.

Figure 10:
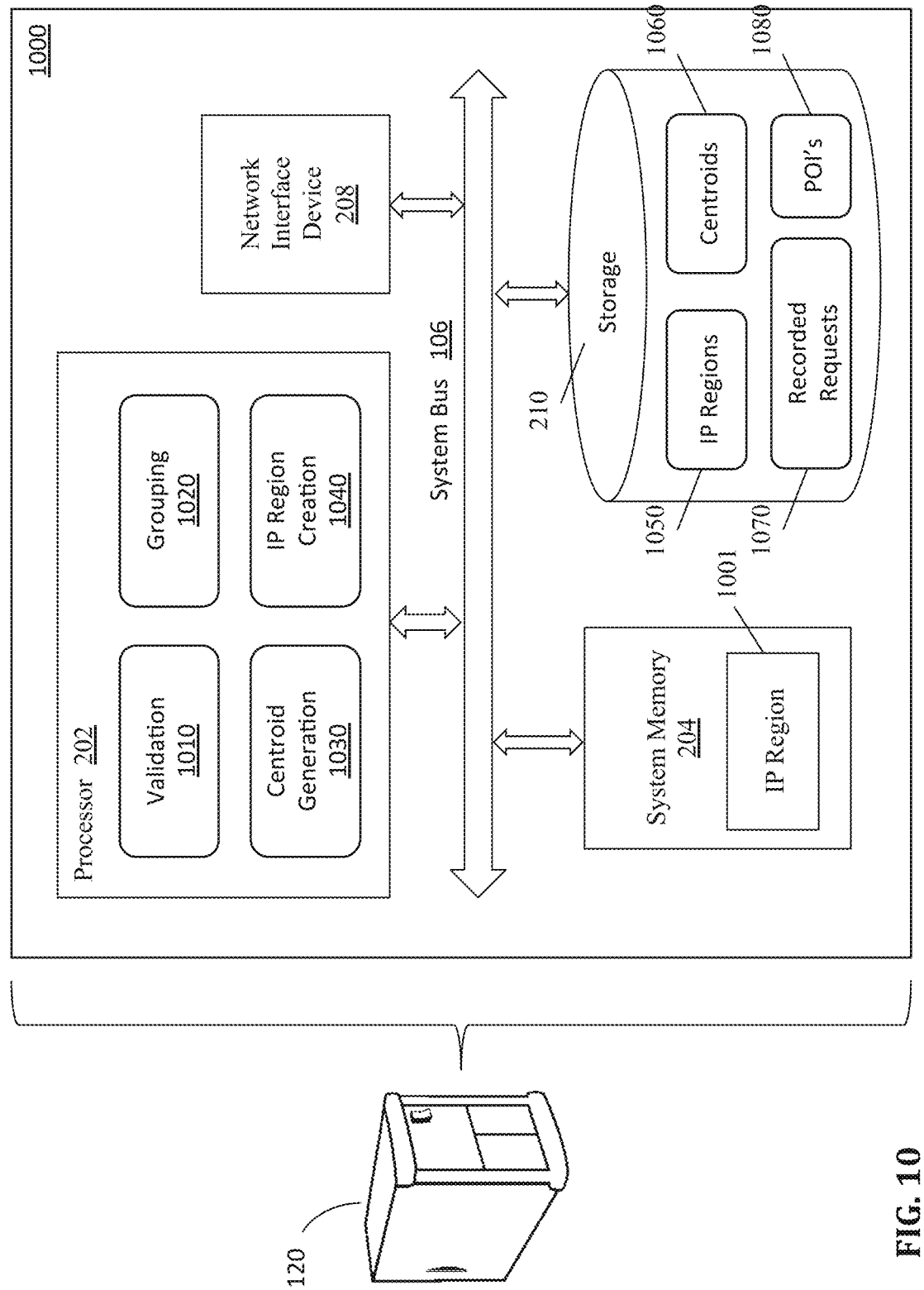
FIG. 10 is a diagrammatic representation of an IP region system provided by a computer/server system according to certain embodiments.

FIG. 10 is a diagrammatic representation of an IP region system 1000 provided by a computer/server system 120 according to certain embodiments. As discussed above, an IP region can be used as probable locations to select from when a request comes with an IP address but without accurate geographical coordinates. The IP region system 1000 derives IP regions corresponding to respective IP addresses using ad requests including the respective IP addresses that have been received over a period of time (e.g., a few days). As shown in FIG. 10, the processor 202 in the computer/server system 120, when executing an IP region software program 1001 loaded in the main memory 204, provides the IP region system 1000 including a validation module 1010, a grouping module 1020, a centroid generation module 1030, and a IP region creation module 1040. The system 1000 makes use of a plurality databases storing data used and/or generated by the IP region software program 1001, including a database 1050 for storing IP regions generated by the IP region creation module 1040, a database 1060 storing the centroids generated by the centroid generation module 1030, a database 1070 for storing received ad requests, and a database 1080 for storing a Point of Interest (POI) directory. Any or all of these databases can be located in the storage 210, or in another server/computer 120 and/or NAS 121 in the network 100, which the process 202 can access via the network interface device 208.

Figure 11:
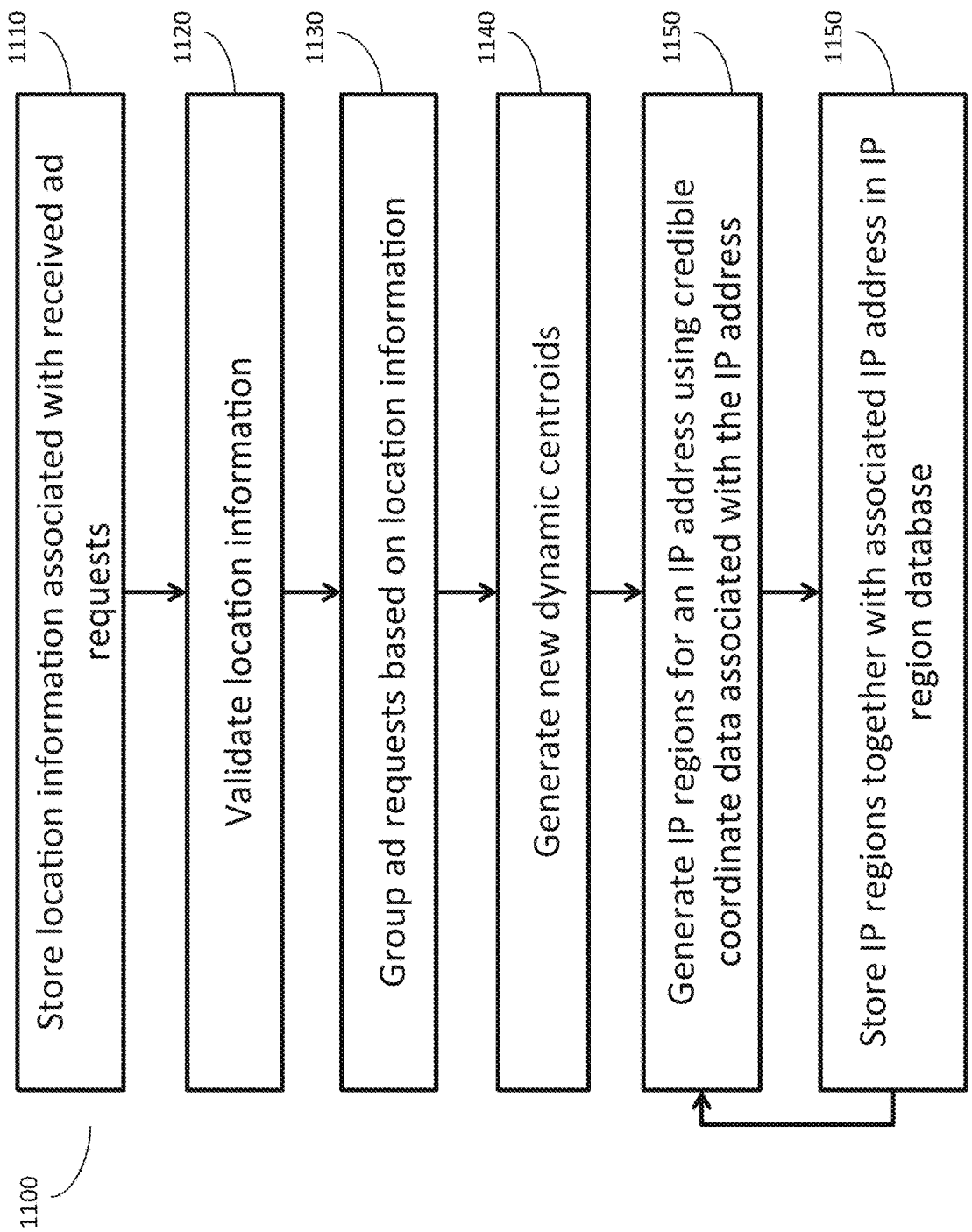
FIG. 11 is a flowchart illustrating a method performed by the IP region system to derive IP regions for respective IP addresses according to certain embodiments.

FIG. 11 is a flowchart illustrating a method 1100 performed by the IP region system 1000 to derive IP regions for respective IP addresses according to certain embodiments. As shown in FIG. 11, when ad requests traffic come in, the IP region system stores (1110) at least the location information of the ad requests in the database 1050. After a certain period of time (e.g, a few days), the IP region system 1000 performs the method 1100 to derive IP regions from the stored location information. The validation module 1010 examines (1120) the LLs in the stored location information to determine whether each set of LL is a true LL (i.e., representing actual mobile device location). Based on the determination, the grouping module 1020 groups (1130) the requests or their respective location information into different traffic groups, such as the following:

1. T(IP, TLL)—Each request in this group has an IP and also a valid geo-precise LL;
2. T(IP, DLL_Static)—Each request in this group has an IP and a derived LL that correspond to a static centroid, i.e., a centroid derived from geographic mapping (e.g., a city center) or IP vendor mapping;
3. T(IP, DLL_Dynamic)—Each request in this group has an IP and a derived LL that is not a static centroid;
4. T(NoIP, TLL)—Each request in this group has a valid geo-precise LL but no IP;
5. T(NoIP, DLL_Static)—Each request in this group has a derived LL corresponding to a static centroid but no IP;
6. T(NoIP, DLL_Dynamic)—Each request in this group has a derived LL that is not a static centroid;
7. T(IP, NoLL)—Each request in this group has an IP but no LL.

In certain embodiments, the grouping module 1020 puts location information into the T(IP, DLL_Static) group if the location information has an IP address and the LL in the location information corresponds with LL of a static centroid stored in the centroid database. In certain embodiments, static centroids associated with well-know geographic regions such as cities, regions associated with zip codes, etc. are stored in the centroid database. If the LL of a request correspond to one of the static centroids, it is highly likely that this LL is not a true LL but an LL mobile publishers put together by referring to the city of the mobile user.

In certain embodiments, the grouping module 1020 puts location information into the T(IP, DLL_Dynamic) group if the location information has an IP address and the LL in the location information does not correspond with any of the static centroids in the centroid database but corresponds with the LL of a dynamic centroid (i.e., a centroid that occurs with this IP address very frequently or above a threshold in a given period—indicating another IP vendor's database being used by a publisher to derive the LL from an IP, while not being covered by known static IP centroids).

In certain embodiments, the grouping module 1020 puts location information into the T(NoIP, DLL_Static) group if the location information does not have an IP address and the LL in the location information corresponds with LL of a static centroid stored in the centroid database. In certain embodiments, static centroids associated with well-know geographic regions such as cities, regions associated with zip codes, etc. are stored in the centroid database. If the LL of a request correspond to one of the static centroids, it is highly likely that this LL is not a true LL but an LL mobile publishers put together by deriving from an IP address.

In certain embodiments, the grouping module 1020 puts location information into the T(NoIP, DLL_Dynamic) group if the location information does not have an IP address and the LL in the location information does not correspond with any of the static centroids in the centroid database but corresponds with the LL of a dynamic centroid (i.e., i.e., a centroid that occurs with this IP address very frequently or above a threshold in a given period—indicating another IP vendor's database being used by a publisher to derive the LL from an IP, while not being covered by known static IP centroids).

In certain embodiments, the grouping module 1020 puts location information into the T(IP, TLL) group if the location information has an IP address and the LL in the location information does not correspond with any of the static centroids in the centroid database, or any of the dynamic centroids in the dynamic centroid database 1060. Likewise, the grouping module 1020 put location information into the T(NoIP, TLL) group if the location information has no IP address and the LL in the location information does not correspond with any of the static centroids in the centroid database, or any of the dynamic centroids in the dynamic centroid database 1060.

In certain embodiments, the centroid module 1020 determines whether any of the location information in the T(IP, TLL) group actually includes derived LLs even though these LLs are not found in the dynamic centroid database 1060 or IP region database 1050, and creates (1140) a new dynamic centroids corresponding to these possibly derived LLs. For example, if a first number of requests made in a certain amount of time with the same IP and the same LL (or LLs in very close range with each other) is unusually large, it is likely that this same LL or closely spaced LLs are actually derived LLs for the IP address because these many mobile users are unlikely to be at the same spot in such a short period of time. The centroid module 1020 may check the POI database to see if the IP address is associated with a POI, which would host many mobile users. If not, the centroid module 1020 may use these LLs to derive (1140) a dynamic centroid and store this LL together with the IP address in the dynamic centroid database 1060. The IP region system 1000 may also take the first number of requests with this IP address and the same LL (or closely spaced LLs) out of the T(IP, TLL) group and put them into the T(IP, DLL_Dynamic) group.

As another example, if a second number of requests made in a certain amount of time with no IP and with a same LL (or closely spaced LLs) is unusually large, it is likely that this same LL (or closely spaced LLs) is actually a derived LL because these many mobile users are unlikely to be at the same LL in such short period of time. The centroid module 1020 may regard this LL (or closely spaced LLs) as a dynamic centroid and store this LL in the dynamic centroid database 1060. The grouping module 1010 may also take the second number of requests with no IP address and with the same LL (or closely spaced LLs) out of the T(NoIP, TLL) group and put them into the T(NoIP, DLL_Dynamic) group.

Figure 12:
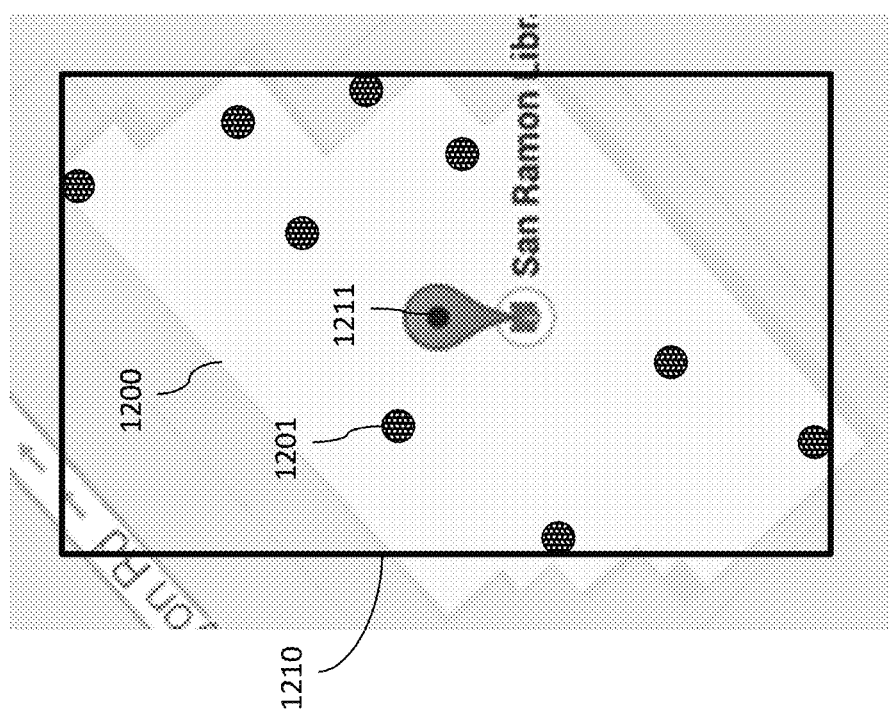
FIG. 12 is a diagram illustrating an exemplary IP region created using location information from multiple ad requests according to certain embodiments.

For each respective IP address in the surviving T(IP, TLL) group, the IP region creation module 1040 generates (1150), an IP region using the TLLs associated with this IP address in the T(IP, TLL) group. For example, as shown in FIG. 12, the TLLs 1201 associated with the IP address of a WiFi device at an establishment 1200 (e.g., a city library) are used to derive an IP region 1210, which is a polygon (e.g., rectangle) with a center location 1211 being a centroid derived from the TLLs 1201 and a size that is determined by the span of the TLLs in the T(IP, TLL) group. The IP region can be represented by a set of points, such as:

IP Region=$\{P_1, P_2, \ldots, P_m\}$
where a point, $P_m$, is given by
$P_m=\{Latitude_m, Longitude_m\}$ The center location 1211 is also stored as the centroid associated with the IP region 1210. By representing a region as a set of points, the resolution of a region can be set to arbitrary levels depending on the number of points. For example, a region with three points can be used to encode a triangular-shaped region, four points a rectangular-shaped region, etc.

Thus, IP regions are generated from ad requests that include IP addresses together with GPS-based LLs. Dynamic LL centroids and Dynamic IP centroids are some of the mechanisms to figure out bad LLs to weed them out, and thus not use in IP region construction. In certain embodiments, certain true LLs are not used to derive dynamic LL centroids. For example, if an LL occurs only during day time, but not during night time, at a certain frequency, it is not considered for dynamic LL centroid derivation, since this could be a valid POI like library where the router's LL is being obtained. However, if an LL occurs above a certain frequency during night time when real users are unlikely to be present, it is assumed that it is derived LL and qualifies for use dynamic LL centroid derivation.

Figure 13:
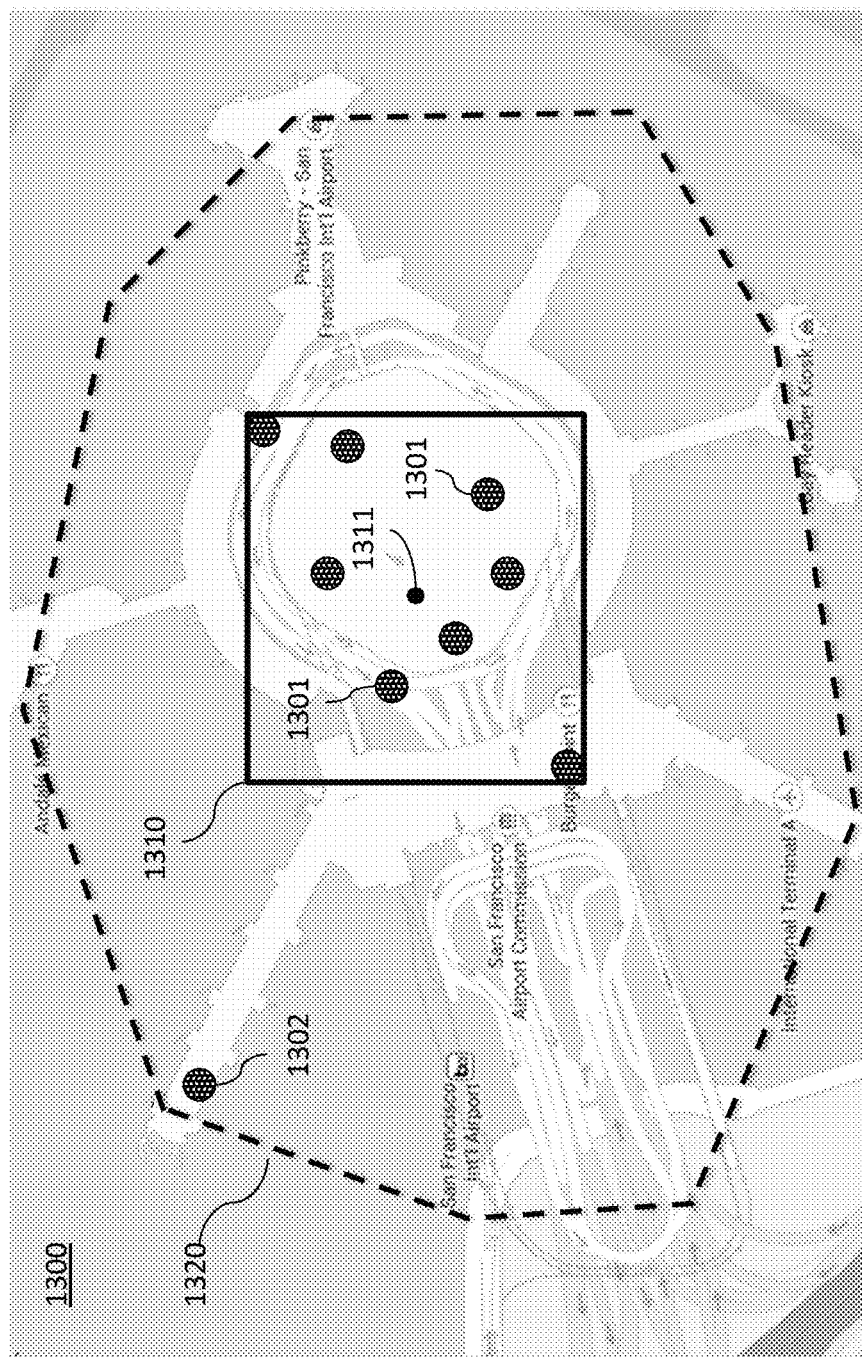
FIG. 13 is a diagram illustrating an exemplary IP region for a large establishment such as an airport according to certain embodiments.

In certain embodiments, as shown in FIG. 13, when an establishment is large, such as an airport 1300, the IP region 1310 derived from the TLLs 1301 with centroid 1311 may not represent the full span of the establishment linked to the same IP address because the TLLs obtained are either concentrated in a small area, or another outlier TLL 1302 is weeded out when deriving the centroid 1311 and the IP region 1310. Thus, the IP region engine would consult the POI database, to see if the calculated IP region is smaller than the POI region stored in the POI database, and if so, the POI region will be stored as the IP region for the IP address in the IP region database.

In certain other embodiments, an IP region could be as large as a zip code when the associated IP address corresponds to a cellular IP address for a cellular tower. Hence, IP ranges could be as small as less than 50 meters, to as large as covering a wide area.

The IP region system 1000 stores the IP regions generated by the IP region creation module 1040 in the database 1050. FIG. 14 illustrates a few examples of IP regions stored in the database 1050 as spatial indices together with the associated IP addresses and other information such as their respective centroids, etc. When an ad request comes in including an IP address but without true LL, the IP regions database 1050 is queried with the IP address, and if a match is found, the centroid of the IP region can be used as an estimated location for the ad request, or the entire IP region can be used as a probable region of the mobile device associated with the ad request.

Figure 15:
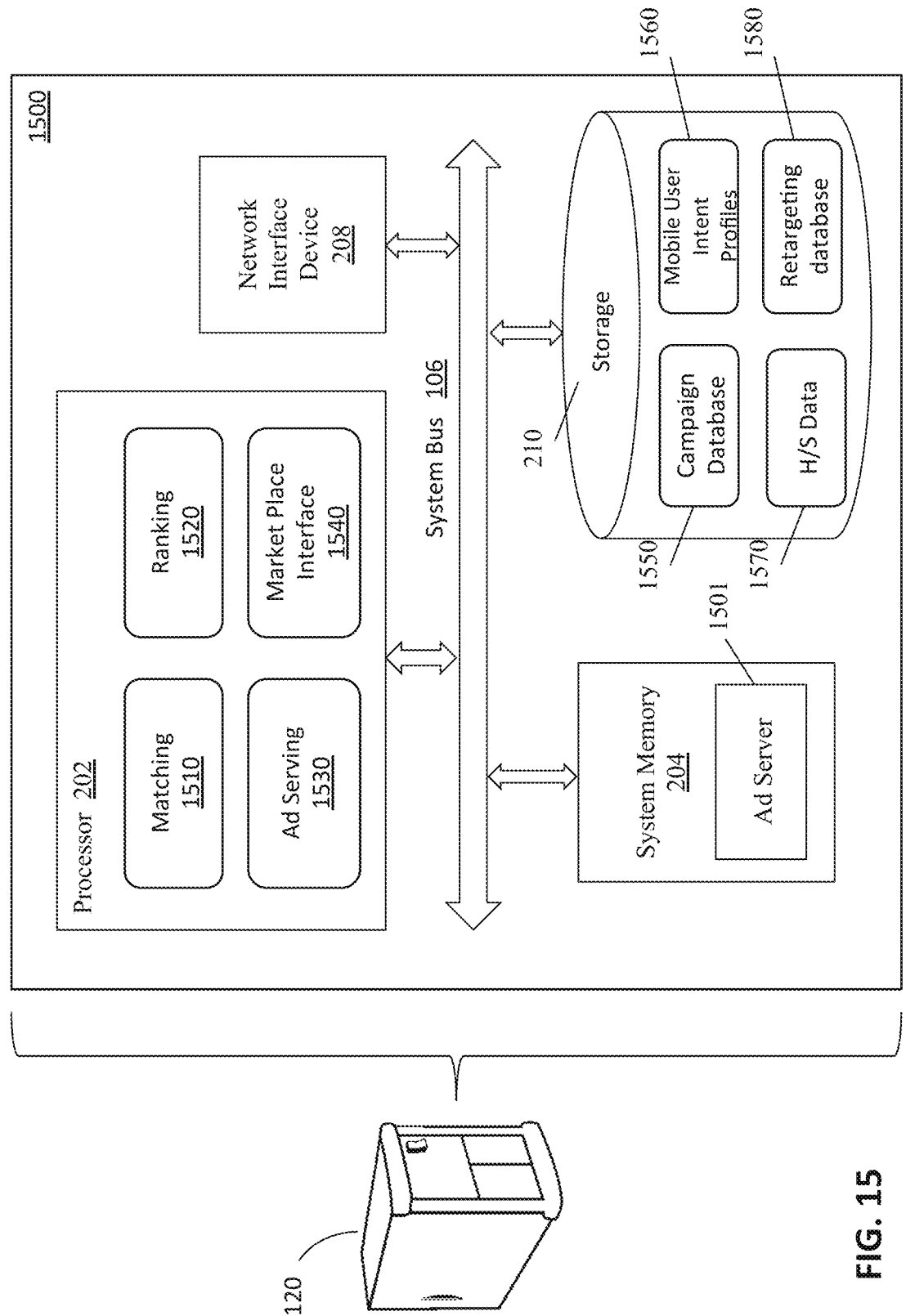
FIG. 15 is a diagrammatic representation of an ad server system according to certain embodiments.

FIG. 15 is a diagrammatic representation of an ad server system 1500 provided by a computer/server system 120 according to certain embodiments. As shown in FIG. 15, the processor 202 in the computer/server system 120, when executing an ad serving software program 1501 loaded in the main memory 204, provides the ad server system 1500 including a matching module 1520, a ranking module 1520, and one or both of an ad serving module 1530 and an ad exchange interface. The system 1500 makes use of a plurality databases storing data used and/or generated by the ad server software program 1501, including one or more of an ad campaign database 1550 for storing ad campaign parameters and ad documents for delivery to mobile devices, a database 1560 storing mobile user intent profiles, and a database 1570 for storing historical/statistical data, and a retargeting database 1580. Any or all of these databases can be located in the storage 210, or in another server/computer 120 and/or NAS 121 in the network 100, which the process 202 can access via the network interface device 208. The ad server system may further include conventional ad server functions in addition to the novel features disclosed herein In certain embodiments, to improve return on investment (ROI) for an advertisement campaign for a certain brand or store, device IDs associated with mobile users who have visited the brand or store are stored in the retargeting database 1580. The retargeting database 1580 is consulted when a subsequent ad request associated with the same or similar mobile user is processed. If the request is from a user whose device ID is found in the retargeting database, an advertisement document associated with the brand or store can be chosen for delivery to the user. The advertisement can be an advertisement for the particular store so as to draw the mobile user to visit the particular store again. Or, if any competitor store or any store in the same category of the particular store is in the vicinity of any of the mobile user, the advertisement can be an advertisement to draw the mobile user from the competitor store or the other store in the same category of the particular store. This way, more relevant advertisement can be provided to mobile users, increasing the ROI for the advertisement campaigns. In certain embodiments, as shown in FIG. 16A, the retargeting database 1580 includes, for each brand or store that is named for retargeting as part of an ad campaign, a plurality of mobile user identifiers associated with mobile users who have visited the brand or store. The time stamp for each visit may also be included so that older data can be discarded or ignored. A retargeting factor may be calculated for each event and is made to decay with the lapse of time so that older events become less important.

To build the retargeting database, mobile device IDs (or hashed versions of same) associated with mobile users who have visited any particular store/brand for which an advertisement campaign is being run, and/or other stores in the same category as the particular store/brand (stores/brands of interest). Each time a request for document is processed by the ad request processing system 700, and is found to indicate that the associated mobile device is at or near one or more of the stores/brands of interest (i.e., a location-based event), the associated mobile device ID is stored together with the one or more stores/brands and/or their associated category or categories. The POI database may be consulted to determine the category or categories for the one or more of the stores of interests. FIG. 16B illustrates examples of location-based events showing a few requests indicating events of their associated mobile users being at stores B1, B2, and B3. If store B1 is a store of interest, the device IDs associated with event No. 2, 3, 5, . . . , and 9975 are stored together with the store B1 and/or its associated category or categories in the retargeting database. As shown in FIG. 16B, more than one stores can be associated with a same user or device ID indicating the different stores the associated user has visited, and more than one category can correspond to one store.

The time stamp in the event database can be important because events associated with a same mobile user that occur at the same place and within a range of time can simply mean one single prolonged visit. Or, if the duration lasts for a few hours regularly in each of several consecutive days, the associated events may simply mean that the mobile user is an employee, rather than a customer, at a certain business, and these events may be weeded out and not contribute to any entry in the retargeting database. A retargeting factor may be computed for each location-based event based on, for example, a fence type of a triggered fences, and/or other factors. As shown in FIG. 16B, the retargeting factor for a BR fence type is smaller than the retargeting factor for a BP fence type, which is smaller than the retargeting factor for a BC fence type. For example, instead of International Mobile Equipment Identity (IMEI) numbers, which are not privacy safe, Apple IDFA and/or Google Advertising ID can be used as user identifiers.

The database 1560 stores mobile user intent profiles of a plurality of mobile users. In certain embodiment, each mobile user intent profile is created from location-based events associated with the mobile device carried by a respective mobile user. The location-based events provide a list of points of interest (POIs) the respective mobile user has visited over the course of a week, a month, etc. These user intent profiles may then be employed as a tool to allow mobile advertisers to recalibrate their campaign to target audiences based on their behavior to optimize returns. The creation of user intent profiles is performed after a certain amount of time have lapsed or a certain amount of location-based events have accumulated in a database, and thus does not necessarily consume real time computing power.

The user intent profiles are derived from location based events collected over a certain period of time, such as those shown in FIG. 16B. Again, the time stamp in the event database can be important because events associated with a same mobile user that occur at the same place and within a range of time can simply mean one single prolonged visit. Or, if the duration lasts for a few hours regularly in each of several consecutive days, the associated events may simply mean that the mobile user is an employee, rather than a customer, at a certain business, and these events may be weeded out when the user intent profile is derived.

To derive the user intent profile for a specific user, most or all of the events associated with the mobile user (or his/her device ID) are examined, and from which an intent profile for the specific user can be derived. The intent profile can include, for example, categories of stores/businesses the specific mobile user has visited, the number of events for each category. The intent profile may also give weights to each visit. For example, a prolonged stay at a business may mean heightened interest on the mobile user's part, which should be taken into account in the user intent profile. Also, older data may be less significant than newer data, so a decay factor of $0<w<1$ can be added to the events based on their respective time stamp.

In certain embodiments, the intent profile database 1560 can be built on top of a Key-Value store like Redis, where the Key is the UID or a derived/hashed value of the UID, and the Value is the intent model data of this UID. One exemplary implementation of an intent model is to build an interest weights or affiliation weights map that associates an intent score for each category or each brand name. The intent score can be updated in a time-decay function, such as:

$$new\_score = old\_score * w + 1$$

where $0<w<1$.

At the user level, each user's intent profile could be represented as a vector of intent scores:

$$Intent\_score = (s\_1, s\_2, \ldots, s\_n)$$

where $s\_i$ represents the intent score corresponding to the i-th category and/or brand.

In certain embodiment, users are grouped into segments based on their intent profiles in the database 1560. The grouping process is carried out based on the vectors of intent scores using clustering algorithms such as Kmeans algorithm. Once user segments are defined, ad delivery is determined separately for different segments.

In certain embodiments, the ad server system 1500 receives the annotated ad request 910 from the request processing system 700, which can be provided by the same computer/server system 120 that also provides the ad server system 1500, or by another computer/server system 120 in the network 100. The matching module 1520 searches in the campaign database 1550 for one or more matching ads by comparing the characteristics in the annotated request 910 with requirements of a number of advertisement documents stored in a campaign database to find one or more matching advertisement documents. For example, as shown in FIG. 16C, where each row represents a set of matching criteria of an advertisement document, the store Costco can have three sets of matching criteria each corresponding to a different type of place and/or different trigger accuracy. They may also belong to different category of goods/services and require different request attributes, such as different range of mobile user ages, different days of the week, and/or different hours during the day. The advertiser or merchant may offer different prices for request meeting these different sets of criteria. For example, the advertiser or merchant may offer $30 CPM for ads in response to requests triggering the BC place and coming from users in the age range of 20-50 years old, while offering only $10 CPM for ads in response to requests triggering the BP place and coming from users in the same age range.

If more than one matching ad documents are found, the ranking module 1520 ranks the matching ad documents based on the types of businesses the ad documents are associated with, the price offered for delivering each matching ad document, the mobile user intent profiles in the database 1560, the historical/statistical data in the database 1570, and/or information in the retargeting database 1580 in accordance with preset algorithms that are configured to optimize or improve advertisement efficiency. For example, an ad request may trigger both the BR place of Costco and the BR place of T.J. Maxx. The ranking module 1520 may examine the request attributes and the bid price for each of these two advertisement documents. For example, if the mobile user associated with the ad request is a 20 year old male and the request is sent on Monday during lunch hour, and the historical/statistical data indicates that males in their 20s are less likely to visit T.J. Max during lunch hours, it could be inferred that the mobile user is more interested in fast food offered by Costco than shopping in T.J. Max. Thus, in this situation, even though Ad 01233 for Costco for the BR place is priced much lower than the Ad 02457 for T.J. Max, Ad 01233 is selected for its higher possibility of a positive mobile user response to the ad. On the other hand, if the mobile user associated with the ad request is a 50 year old female and the request is sent on a Saturday afternoon, it could be inferred that the mobile user is more likely heading toward the department store, and Ad 02457 is selected over Ad 01233.

In certain embodiments, the ranking module 1520 selects an advertisement document from the one or more matching advertisement documents by looking into historical/statistical data, the mobile user profiles, and/or the retargeting database to determine the propensity of the mobile user to react positively to any of the one or more matching advertisement document. The historical/statistical data, the mobile user profiles, and/or the retargeting database may be derived from fulfilled ad requests and mobile user responses in the past, as discussed in further detail below. For example, as shown in FIG. 17, which lists the location information, time of request, advertisement category and mobile user response for each fulfilled ad request associated with a mobile user over the course of six months. A user intent profile can be derived from these historical data that indicates that the mobile user has a tendency to respond positively by clicking on ads in the C2 category, or by visiting stores of C2 category, while ignoring mostly ads in the C1 category. Thus, the ranking module 1520 would favor advertisement documents in the C2 category over advertisement document in the C1 category. Similarly, sometimes, the historical data may also show that a user tends to respond positively to ads when he is in BP type places covering parking lots of different businesses/categories, presumably while waiting for others. This preference of a particular type of places is also considered by the ranking module 1520 to select an advertisement document for delivery to the mobile user.

Instead of, or in addition to, using the historical data, statistical data associated with each of the one or more matching advertisement documents can be used to aid in the selection of the advertisement document for delivering to the mobile user. Statistical data associated with an advertisement document can be gathered from mobile users, who have responded positively to the same or similar advertisement documents by visiting stores (being in BC/BP of a store) of the same or similar advertisement document, is also considered as a valid response for this purpose. Over the course of time, the responses from mobile users can be grouped in different place types, mobile user characteristics, such as age, gender, education level, annual income ranges, and/or device make/models. The distribution over these groups can be used to determine if a current mobile user has a tendency to react positively to the advertisement document. For example, the statistical data of an advertisement document shows that a female of the age of 20-40 years old and having a college education and an income level of $50K-$100K, when in BR type of places, has a strong tendency to react positively to a certain type of advertisement documents. Thus, if the ad request 910 includes the attributes that match the bolded attributes in FIG. 18, the advertisement document can be favored during the selection if other factors do not suggest otherwise.

Figure 19:
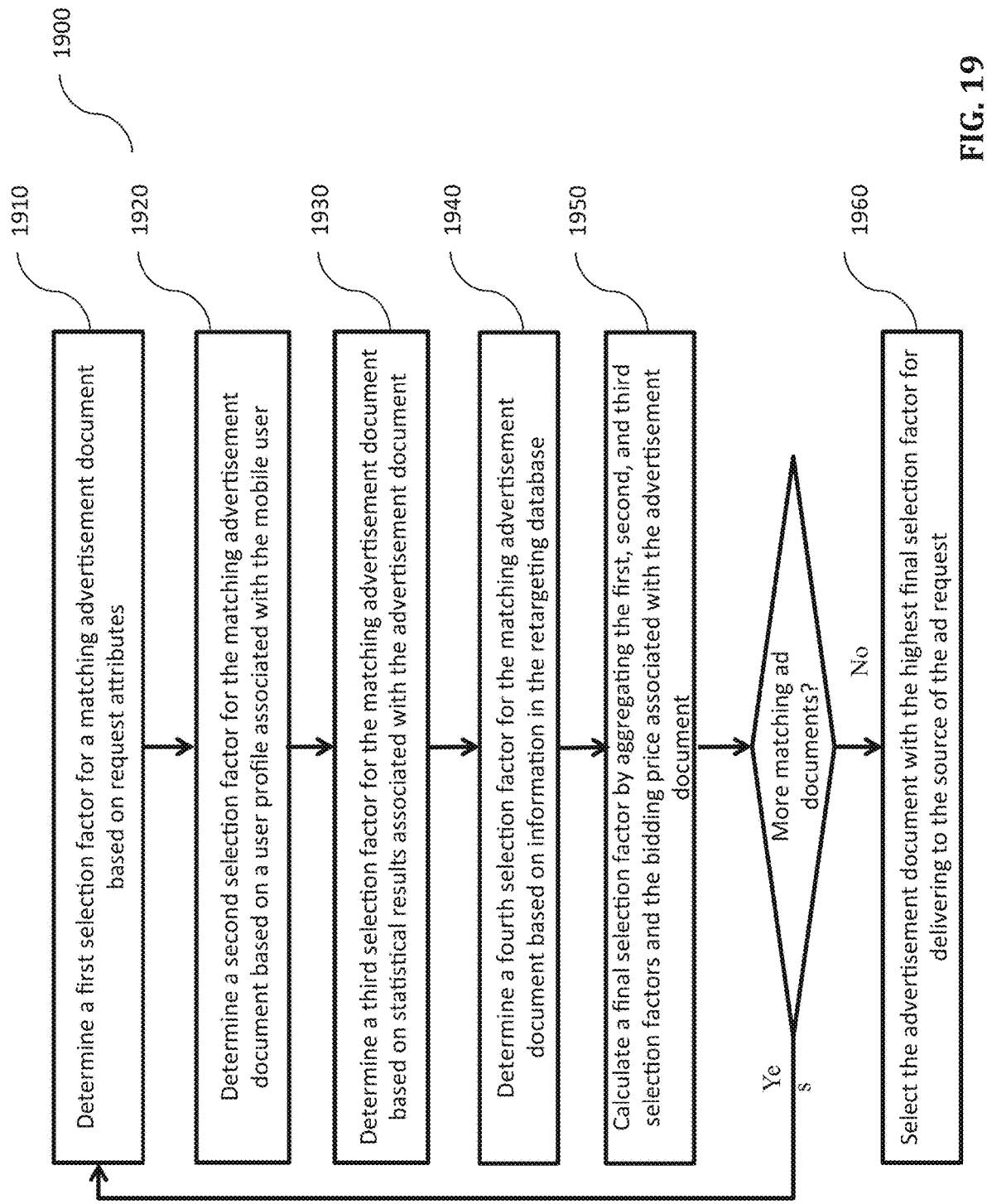
FIG. 19 is a flowchart illustrating a method of selecting advertisement document take into account multiple factors according to certain embodiments.

In certain embodiments, the ranking module 1520 employs an algorithm, such as the method 1900 shown in FIG. 19, to take into account multiple factors to select an advertisement documents for delivering to the mobile device 130. As shown in FIG. 19, the method 1900 comprises, for each of the matching advertisement documents, determining (2310) a first selection factor for the matching advertisement document based on request attributes, such as the triggered place, the mobile user's age, gender, education level, etc. If the database 1560 is provided and a user profile for the mobile user is available, the method further comprises determining (2320) a second selection factor for the matching advertisement document based on a user profile or historical data associated with the mobile user. If the database 1570 is provided and statistical results associated with the matching advertisement document is available, the method further comprises determining (2330) a third selection factor for the matching advertisement document based on statistical results associated with the advertisement document. If the database 1580 is provided and includes information associated with the advertisement document, the method further comprises determining (2340) a fourth selection factor for the matching advertisement document based on information associated with the advertisement document in the retargeting database 1580. The method then proceeds to calculating (2350) a final selection factor by aggregating the first, second, and third selection factors and the bidding price associated with the advertisement document. After the final selection factors for all of the matching advertisement documents are calculated, the matching advertisement document with the highest selection factor is selected (2360) for delivery to the mobile device associated with the ad request 901.

For example, if an ad request associated with a 30 year old male mobile user comes in during lunch hour on a weekday and its annotated version matches all of the advertisement documents shown in FIG. 20C, the ad documents with the category "fast food" can be given a higher first selection factor than the ad document with the category "electronics," which can be given a higher first selection factor (SF1) than the ad document for the category "general merchandise," which can be given a higher first selection factor than the ad document for the category "department store," as shown in FIG. 20. Now, if the mobile user has a history of favoring electronic ads, the ad document with the category "electronics" can be given a higher second selection factor (SF2) than the rest of the ads.

Further, if the statistical results indicate that the mobile user is more likely to respond to ads in the categories of "electronics" and "general merchandise," the ad documents with the categories "electronics" and "general merchandise" can be given a higher third selection factor (SF3) than the rest of the ads. Moreover, the retargeting database 1580 is consulted to see if the mobile user has been in any of the business locations associated with the ad documents recently, and the fourth selection factor (SF4) is given for each matching ad document based on information in the retargeting database 1580. Finally, the first, second and third selection factors for each ad document are aggregated together with the bidding price of the ad document by weighted summation, multiplication, or a combination thereof, or any other algorithms, to generate the final selection factor (FSF). For example, in one embodiment, a simple formula of: $FSF=(SF1+SF2+SF3)*P$, where P is the bid price of the advertisement document, can be used to calculate the final selection factor, as shown in FIG. 20. Thus, Ad 01231 is selected in this example as the advertisement document for transmitting to the requester for delivering to the mobile device 130. In certain embodiments, the ad serving module 1530 retrieves the selected ad request from the campaign database 1550 and forms the data packets from the ad document and transmit the data packets to the requester via the network interface device 208.

Figure 21:
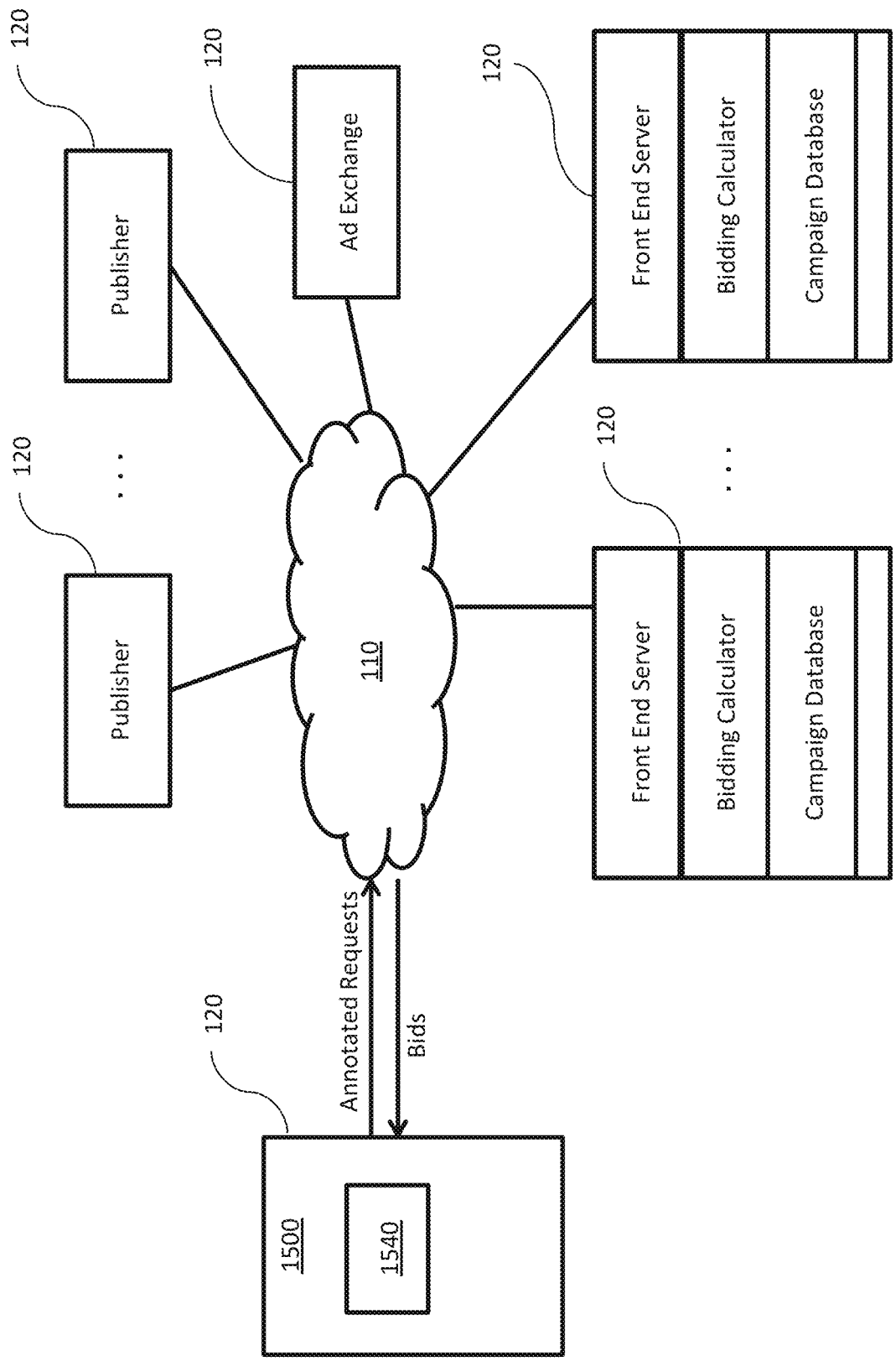
FIG. 21 is a diagrammatic representation of a mobile advertisement market place according to certain embodiments.

In certain embodiments, the ad server system 1500 further comprises a market place interface module 1540, which receives annotated requests 910 from the ad annotation module 204 and transmits the annotated requests 910 in one or more data packets to one or more computer/servers 120 running an ad exchange or ad market place via a packet-based network such as the Internet 110, as shown in FIG. 21. The annotated ad request 910 gets posted by the ad exchange or ad market place post for bidding by mobile advertisers via their respective computer/server system 120, each of which may provide a front-end server and a bidding calculator, and has access to a campaign database. The front-end server monitors the ad requests posted on the ad exchange and transmits the bids generated by the bidding calculator. The bidding calculator calculates bid prices for the ad requests posted on the ad exchange using conventional or proprietary algorithms, such as those discussed above, and generate the bids for transmission by the front-end server.

In certain embodiments, the market place interface module 1540 may determine a minimum bid price for the annotated request and attach the minimum bid price to the annotated request 910 before transmitting it to the bidders. The market place interface module 1540 is further configured to receive the bids from the bidders and/or the ad exchange. Each bid may include information such as a bidder ID, the request ID, price for the bid, etc. The market place interface module 1540 may forward the bids received within a preset time period after transmitting the annotated ad request 910 to the ad serving module, which may select an ad corresponding to the ad request 901 from the bids and/or the matching ads from the campaign database based on their respective prices and performance prediction, as discussed above.

Figure 22:
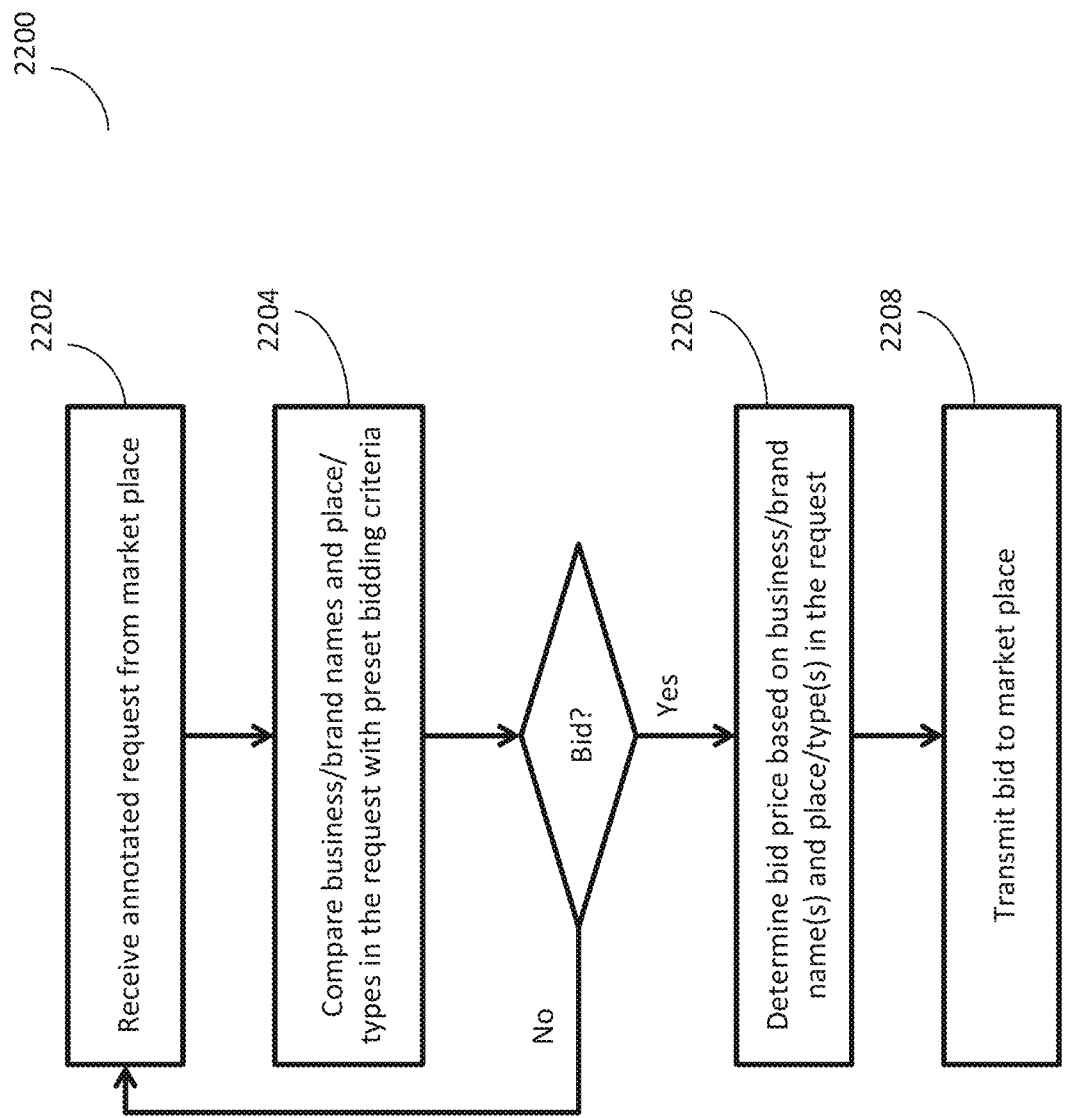
FIG. 22 is a flowchart of a method for performed by an on-line marketer to evaluate an annotated request according to certain embodiments.

In certain embodiments, the annotated ad request 901 is fulfilled by another mobile advertiser that offered the winning bid for the ad request 910 instead of by the ad server system 1500. The bidding calculator in the computer/server system 120 of the other mobile advertiser is configured to utilize the information provided in the annotated ad request 910 in calculating the bid price. For example, as shown in FIG. 22, in certain embodiments, the computer/server 120 of the other mobile advertiser is configured to receive (2602) an annotated request 910 from the ad exchange and determines whether to place a bid for the annotated ad request 910 by examining (2604) the request attributes and the places in the annotated ad request, with respect to preset campaign criteria similar to that shown in FIG. 20C. For example, if an ad campaign for Target Stores specifies places such as Walmart building and parking lots, and the annotated request 910 is annotated with a place having business/brand name Walmart and location/type US/CA/(Mountain View)/BP, a determination to place a bid would be made (2606). Next, the bidding calculator can use the same or similar process described with reference to FIGS. 19 and 20, to generate (2608) a bid of, for example, $0.15 CPC, for an ad document to be delivered in response to the ad request.

In certain embodiments, as shown in FIG. 9C, an ad request can be annotated with more than one place and the bidding calculator may consider more than one of these places in calculating the bid price. For example, if an ad request is annotated with business/brand name Target and place US/CA/Mountain View/BR, and with business/brand name Walmart and place US/CA/Mountain View/BP, the bidding calculator may raise the bid price to, for example, $0.20 CPC, for a Target ad, because the mobile user is at the vicinity of both of the two competing stores and is more likely to be swayed from one store to another in response to the mobile ad.

Thus, methods and apparatus according to certain embodiments enable a location market place. In this market place, the merchandises or supplies are the mobile requests properly tagged with mobile user intent indications represented by places in which the mobile users are located. The buyers are the advertisers who are interested in delivering ads based on the places and can bid on the places. The market place can determine the winning bidder based on the bidding price and location-based performance estimation, which together determine the market place efficiency. Thus, the market place can be used for maximized or increased benefits to both advertisers and publishers.

Figure 23:
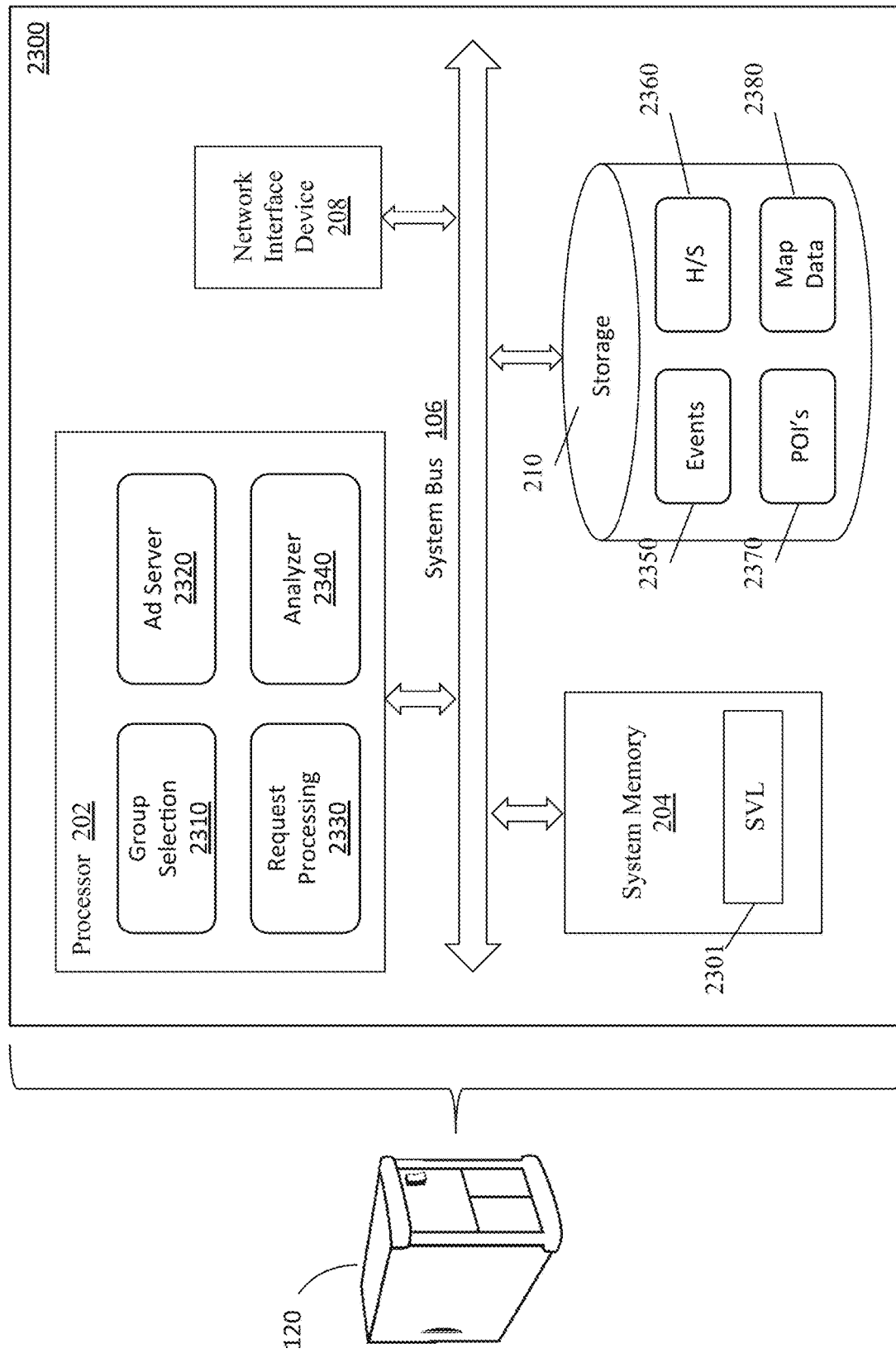
FIG. 23 is a diagrammatic representation of a store visit lift (SVL) system according to certain embodiments.

FIG. 23 is a diagrammatic representation of a store visit lift (SVL) system 2300 provided by a computer/server system 120 according to certain embodiments. As shown in FIG. 23, the processor 202 in the computer/server system 120, when executing an SVL software program 2301 loaded in the main memory 204, provides the SVL system 2300 including a group selection module 2310, an ad server module 2320, an ad request processing module 2330, and an analyzer module 2340. The system 2300 makes use of a plurality databases storing data used and/or generated by the SVL software program 2301, including one or more of a database 2350 for storing location-based events, a database 2360 storing historical/statistical data, a POI directory 2370, and a database for map data 2380. Any or all of these databases can be located in the storage 210, or in another server/computer 120 and/or NAS 121 in the network 100.

Figure 24:
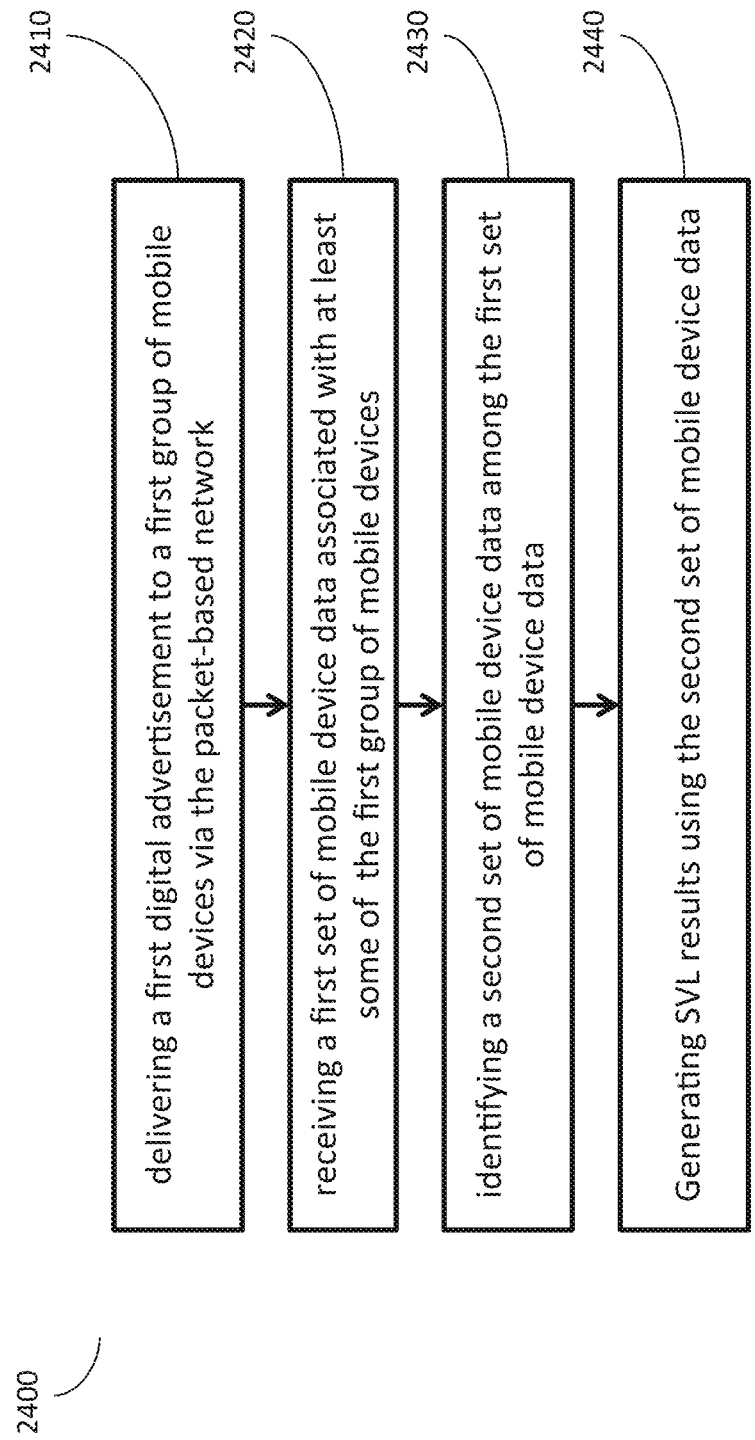
FIG. 24 is a flowchart illustrating a method for increasing store visitation responses to location-based mobile advertising.

FIG. 24 is a flowchart illustrating a method 2400 for increasing store visitation responses to location-based mobile advertising, according to an embodiment of the present disclosure. The ad server 2320 delivers (2410) via the packet-based network a first digital advertisement document (ad) to a first group of mobile devices selected by the group selection module 2310. In one embodiment, the group selection module 2310 uses one or more of several techniques, e.g., panel-based, request-based and a software development kit (SDK), to select the first group of mobile devices for the purpose of collecting mobile user location information, mobile user information such as age, gender, education level, income level, etc., and mobile device information such as mobile device ID in the form of, for example, IMEI (International Mobile Station Equipment Identity), make and model of mobile devices, etc., that is associated with mobile users who may trigger certain location-based events.

When the panel-based technique is used, the first group of mobile devices can be mobile devices associated with a pre-selected panel of mobile users with certain distributions of age, gender, education level, income level, and/or make and model of mobile devices, etc., as illustrated in the examples shown in FIG. 25. In certain embodiments, the pre-selected panel of mobile users have agreed to voluntarily install an application program (app) on their mobile devices to periodically provide their location data to one or more mobile publishers 102, who then share the location data with the SVL system 2300 or include the location data in their requests for documents.

The method 2400 further comprises receiving (2420) a first set of mobile device data associated with at least some of the first group of mobile devices. The first set of mobile device data may come as a result of the mobile publishers sharing the location data associated with the panel of users. In certain embodiments, a software development kit (SDK)

is provided to and installed on the publishers. The SDK applies logic to control the timing of location data being pulled from the mobile devices. Thus, the mobile devices do not need to send their location data continuously to preserve battery life. The location data in this panel-based approach and/or SDK-based approach are usually valid or geo-precise LL, allowing more accurate determination of the locations of the mobile users with respect to the locations of the businesses of interest.

If a panel of mobile users is not available, the first group of mobile users can be randomly selected such that their distributions of age, gender, education level, income level, and/or make and model of mobile devices, etc., are representative of the corresponding distributions of the general mobile user population. The first set of mobile device data may come as part of the requests for documents associated with at least some of the first group of mobile devices, as they interact with the mobile publishers. The ad request processing module 2330 generates, for each request, the location or probable locations from these location data as it does with any incoming request, and determines whether the request triggers any geo-fences or predefined places.

The first set of mobile device data are stored in the request database 2350. FIG. 26 illustrates an example of the first set of mobile device data according to certain embodiments. The first set of mobile device data can be data received during the course of, for example, 24 hours or 7 days, after the first digital advertisement is sent. The group selection module 2310 identifies (2430) a second set of mobile device data among the first set of mobile device data, the second set of mobile device data including location information that indicates responses to the first digital advertisement. For example, as shown in FIG. 26, if the first digital advertisement is for getting more traffic to store B1, the group selection module 2310 would select Data Group Nos. 2, 3, 5, . . . , 9975 out of the first set of mobile device data as the second set of mobile device data because these mobile device data all indicate that the associated mobile users have visited store B1 within 24 hours after the first digital advertisement is sent to them.

In certain embodiments, the mobile device data stored in the request database do not include the business names and the analyzer module 2340 determines whether any of the location information in the first set of mobile device data includes geographical coordinates that correspond to one or more geographic regions associated with the first digital advertisement. For example, if the first digital advertisement is intended to get more traffic to a store located at LL (45.35, 110.75), the group selection module 2310 would choose the mobile device data groups including location coordinates within a certain range of (45.35, 110.75) as the second set of mobile device data, such as the location coordinates associated with Data Group Nos. 2, 3, 5, . . . , 9975, as shown in FIG. 30.

The analyzer module 2340 also generates (2440) statistical results using the second set of mobile device data. The statistical results include performance trends related to one or more of a set of demographics, such as age, gender, education level, annual income, or other device level attributes, such as make and model of mobile devices, operating system, carrier, time of the day, day of week, etc. For example, the statistical results shown in FIG. 27 indicate that female mobile users in the age group of 20-39 with college education and annual income in the range of $50K-$100K are more responsive to the first digital advertisement. These statistical results can then be used by the ad server system 1500 to select an advertisement document in response to a subsequent request. For example, if the subsequent request comes from a 23 year-old female mobile user with college education in the vicinity of store B1, the ad server system 1500 may give preference to the first digital advertisement for store B1 in response to the request because the statistical results indicate that such a mobile user is likely to respond to the advertisement. On the other hand, if the subsequent request comes from a 35 year-old male mobile user with high-school education in the vicinity of store B1, the ad server system 1500 may choose a different digital advertisement for another store B2 because the statistical results indicate that this mobile user is unlikely to respond to the advertisement for store B1.

In certain embodiments, some or all of the systems 300, 700, 1000, 1500, and 2300 can be provided by one computer/server 120 or multiple computers/servers 120 coupled to each other via local and/or wide area networks.

We claim:

1. A system coupled to a packet-based network to process a request associated with a mobile device received from the packet-based network, the request including a request identifier, and location information of the mobile device, comprising:

a boundary definition module configured to generate virtual perimeters of a plurality of places for each respective point of interest (POI) of a plurality of points of interests (POIs) in a geographical area in accordance with map data of the geographical area, the plurality of places including a place of a first type, a place of a second type larger in area than the place of the first type, and a place of a third type larger in area than the place of the second type, wherein the virtual perimeter of each place of the plurality of places is generated in conformity with a corresponding geographical configuration related to the each respective POI and is aligned with a boundary of the each place according to the map data;

a storage device configured to store therein data associated with each respective place having a virtual perimeter generated by the boundary definition module, the data including a name or category of the POI with which the each respective place is associated, a place type of the each respective place, and spatial index of a set of geographic points defining the virtual perimeter of the each respective place;

a location module configured to receive the request from the packet-based network and to estimate a location of the mobile device based on the location information in the request;

a geo-fencing module configured to determine if any of the places stored in the storage device is triggered by an estimated location of the mobile device; and an annotation module configured to generate an annotated request for transmitting to the packet-based network in response to the estimated location of the mobile device having triggered one or more places, the annotated request including the request identifier and information about at least some of the one or more places, the information including, for each particular triggered place of the at least some of the one or more places, a type of the each particular triggered place, and at least one of a category and a name of a POI with which the each particular triggered place is associated;

a network interface module configured to transmit the one or more annotated request data packets to a location marketplace via the packet-based network and to receive one or more real-time bids on the annotated request from the location marketplace via the packet-based network, each bid of the one or more real-time bids each including the request identifier, a bidder identifier, and a bid price;
a ranking module configured to select a plurality of documents from a document database and to rank the plurality of documents based on information in the request and the one or more bids, and wherein the network interface module is configured to transmit information about a selected one of the plurality of documents to the packet-based network.

2. The system of claim 1, wherein the place of the first type corresponds to a center of the each respective POI and the virtual perimeter of the place of the first type is generated in conformity with a building structure of the each respective POI, the place of the second type corresponds to a premise of the each respective POI and the virtual perimeter of the place of the second type is generated in conformity with one or more parking lots associated with the each respective POI, and the place of the third type corresponds to an area of interest around the each respective POI and the virtual perimeter of the place of the third type is generated in conformity with a shape of the area of interests, the area of interests including the each respective POI and one or more other POIs.

3. The system of claim 1, wherein the request further includes a time stamp, wherein each of the plurality of documents are related to respective POIs, and wherein the ranking module is configured to rank the plurality of documents based at least on characteristics of the respective POIs and the time stamp in the request.

4. The system of claim 1, wherein the annotation module is further configured to determine a price threshold for the each particular place and to include the price threshold in the one or more annotated request data packets.

5. The system of claim 1, wherein each of the plurality of documents is related to one of the one or more places and is selected based at least on a type of the one of the one or more places.

6. The system of claim 1, wherein location module:
determines if the information associated with the mobile device include a set of geographic coordinates that meet a set of predefined criteria;
determines if the information associated with the mobile device includes an IP address and querying an IP region database using the IP address in response to the set of geographic coordinates not meeting the set of predefined criteria; and
uses geographical coordinates associated with a matching IP address in the IP region database as an estimated location of the mobile devise in response to finding a matching IP address in the IP region database.

7. The system of claim 6, wherein the one or more annotated request data packets include a confidence factor based on the geographical coordinates associated with the matching IP address, and wherein the geographical coordinates are associated with a geographic region and the confidence factor is dependent on the size of the geographic region.

8. A method performed by one or more computer systems each coupled to a packet-based network, the one or more computer systems including or having access to a data store, the method comprising:
generating virtual perimeters of a plurality of places for each respective point of interest (POI) of a plurality of points of interests (POIs) in a geographical area in accordance with map data of the geographical area, the plurality of places including a place of a first type, a place of a second type larger in area than the place of the first type, and a place of a third type larger in area than the place of the second type, wherein the virtual perimeter of each of the plurality of places is generated in conformity with a corresponding geographical configuration related to the each respective POI and is aligned with a boundary of the each place according to the map data;
storing in the data store information about each respective place of the plurality of places associated with the each respective POI, the information including a name or category of the each respective POI, a place type of the each respective place, and spatial index of a set of geographic points defining the virtual perimeter of the each respective place;
receiving a request including a request identifier and information associated with a mobile device from the packet-based network;
estimating a location of the mobile device based on the information associated with the mobile device;
determining if an estimated location of the mobile device triggers any of the places in the data store;
generating an annotated request in response to the estimated location of the mobile device having triggered one or more places, the annotated request including the request identifier and information about at least some of the one or more places, the information including, for each particular triggered place of the at least some of the one or more places, a type of the each particular place, and at least one of a category and a name of a POI with which the each particular triggered place is associated;
transmitting the annotated requests in one or more annotated request data packets to a location marketplace via the packet-based network;
receiving one or more real-time bids on the annotated request from the location marketplace via the packet-based network, each bid of the one or more real-time bids each including the request identifier, a bidder identifier, and a bid price;
selecting a plurality of documents from a document database and ranking the plurality of documents based on information in the annotated request and the one or more bids;
transmitting one or more data packets including information about a selected one of the plurality of documents to the packet-based network.

9. The method of claim 8, wherein the place of the first type corresponds to a center of the each respective POI and the virtual perimeter of the place of the first type is generated in conformity with a building structure of the each respective POI, the place of the second type corresponds to a premise of the each respective POI and the virtual perimeter of the place of the second type is generated in conformity with one or more parking lots associated with the each respective POI, and the place of the third type corresponds to an area of interest around the each respective POI and the virtual perimeter of the place of the third type is generated in conformity with a shape of the area of interests, the area of interests including the each respective POI and one or more other POIs.

10. The method of claim 8, wherein each of the plurality of documents are related to respective POIs, and wherein the plurality of documents are ranked based at least on characteristics of the respective POIs and a time stamp in the request.

11. The method of claim 8, further comprising determining a price threshold for the each particular triggered place, wherein the annotated request data packets include the price threshold.

12. The method of claim 8, wherein each of the plurality of documents is related to at least one place of the one or more places and is selected based at least on a type of the at least one place.

13. The method of claim 8, wherein estimating a location of the mobile device comprises:
- determining if the information associated with the mobile device include a set of geographic coordinates that meet a set of predefined criteria;
- in response to the set of geographic coordinates not meeting the set of predefined criteria, determining if the information associated with the mobile device includes an IP address and querying an IP region database using the IP address; and
- in response to finding a matching IP address in the IP region database, using geographical coordinates associated with the matching IP address in the IP region database as an estimated location of the mobile devise.

14. The method of claim 13, wherein the one or more annotated request data packets include a confidence factor based on the geographical coordinates associated with the matching IP address, and wherein the geographical coordinates are associated with a geographic region and the confidence factor is dependent on the size of the geographic region.

15. The system of claim 1, wherein the storage device further stores data representing segments of major roads overlapping with some of the places stored in the storage device, and wherein the geo-fencing module is further configured to determine whether the mobile device is traveling on one of the segments of major roads in response to the estimated location of the mobile device having triggered a certain place with which the one of the segments of major roads overlaps, wherein the geo-fencing module is further configured to exclude the certain place from the one or more places in response to the determination that the mobile device is traveling on the one of the segments of major roads.

16. The system of claim 1, wherein at least some of the places stored in the data store are 3-D spaces, each of the 3-D spaces including a 2-D stamp and an altitude span, and wherein the geo-fencing module is further configured to determine whether the estimated location of the mobile device triggers one of the 3-D spaces in response to the estimated location being an elevated location.

17. The system of claim 1, wherein the at least some of the one or more places include a first place associated with a first POI and a second place associated with a second POI, the first place and the second place are of different types.

18. The method of claim 8, further comprising storing in the data store data representing segments of major roads overlapping with some of the places in the data store, determining whether the mobile device is traveling on one of the segments of major roads in response to the estimated location of the mobile device having triggered a certain place with which the one of the segments of major roads overlap, and excluding the certain place from the one or more places in response to the determination that the mobile device is traveling on the one of the segments of major roads.

19. The method of claim 8, wherein at least some of the places stored in the data store are 3-D spaces, each of the 3-D spaces including a 2-D stamp and an altitude span, and wherein determining if an estimated location of the mobile device triggers any of the places in the data store comprises determining whether the estimated location of the mobile device is in one of the 3-D spaces when the estimated location is at an elevated location.

20. The method of claim 8, wherein the at least some of the one or more places include a first place associated with a first POI and a second place associated with a second POI, the first place and the second place are of different types.

* * * * *